United States Patent
Kwak et al.

(10) Patent No.: US 12,166,910 B2
(45) Date of Patent: Dec. 10, 2024

(54) ELECTRONIC DEVICE INCLUDING FLEXIBLE SLIDE-OUT DISPLAY

(71) Applicant: Samsung Electronics Co., Ltd., Gyeonggi-do (KR)

(72) Inventors: Myunghoon Kwak, Gyeonggi-do (KR); Jooyoung Kang, Gyeonggi-do (KR); Jungchul An, Gyeonggi-do (KR); Heuisoo Jeon, Gyeonggi-do (KR); Kwangtai Kim, Gyeonggi-do (KR); Donghyun Yeom, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 235 days.

(21) Appl. No.: 17/696,158

(22) Filed: Mar. 16, 2022

(65) Prior Publication Data
US 2022/0210253 A1 Jun. 30, 2022

Related U.S. Application Data

(63) Continuation of application No. PCT/KR2021/008540, filed on Jul. 6, 2021.

(30) Foreign Application Priority Data

Jul. 31, 2020 (KR) .................. 10-2020-0096261

(51) Int. Cl.
*H04M 1/02* (2006.01)
*G06F 1/16* (2006.01)
(Continued)

(52) U.S. Cl.
CPC ........ *H04M 1/0235* (2013.01); *G06F 1/1624* (2013.01); *G06F 1/1652* (2013.01);
(Continued)

(58) Field of Classification Search
CPC ............. H04M 1/0266; H04M 1/0268; H04M 17/302; H04M 1/02; H04M 1/026;
(Continued)

(56) References Cited

U.S. PATENT DOCUMENTS

| 8,854,332 B1 | 10/2014 | Cho et al. |
| 9,337,433 B2 | 5/2016 | Lim et al. |

(Continued)

FOREIGN PATENT DOCUMENTS

| KR | 1020140065659 | 5/2014 |
| KR | 1020140115226 | 9/2014 |

(Continued)

OTHER PUBLICATIONS (KR 20190079128 A) »> Foldable Display Device (see title) (Year: 2019).*

(Continued)

*Primary Examiner* — Meless N Zewdu
(74) *Attorney, Agent, or Firm* — The Farrell Law Firm P.C.

(57) ABSTRACT

An electronic device is provided that includes a housing and a flexible display including a bendable section that may be extracted from an inner space of the housing. The electronic device also includes a support member positioned at least partially in the inner space of the housing and including a first surface facing the bendable section with a separation distance therebetween, and a dielectric disposed in the first surface while facing the bendable section and electrically connected to a ground. The electronic device also includes a sensor integrated circuit (IC) electrically connected to a touch sensing circuit included in the flexible display and configured to detect capacitance of a touch area facing the dielectric in the touch sensing circuit.

20 Claims, 14 Drawing Sheets

(51) Int. Cl.
　　　*G06F 3/041*　　　(2006.01)
　　　*G06F 3/044*　　　(2006.01)
(52) U.S. Cl.
　　　CPC .......... *G06F 1/1681* (2013.01); *G06F 3/0412* (2013.01); *G06F 3/04164* (2019.05); *G06F 3/044* (2013.01); *H04M 1/0268* (2013.01); *H04M 2201/38* (2013.01)
(58) Field of Classification Search
　　　CPC .......... G06F 3/041; G06F 1/16; G06F 3/0412; G06F 3/147; G06F 2203/04102; G06F 1/1601; G06F 3/044; G06F 1/162; H06F 1/1618; H04L 9/10; H05K 5/00; H05K 5/0018; H05K 7/20954; H05K 1/02; H04W 88/02; G02B 21/368; G02F 1/1345; H01L 27/32
　　　See application file for complete search history.

(56) References Cited

U.S. PATENT DOCUMENTS

| | | | |
|---|---|---|---|
| 10,827,633 | B2 | 11/2020 | Yoo et al. |
| 11,202,365 | B2* | 12/2021 | Kim et al. ........... H05K 1/0243 |
| 11,357,107 | B2* | 6/2022 | Bae et al. ............. H05K 1/115 |
| 11,929,768 | B2* | 3/2024 | Lee et al. ............. H04B 1/0064 |
| 2016/0353588 | A1 | 12/2016 | Kim et al. |
| 2019/0310302 | A1 | 10/2019 | Lee et al. |
| 2020/0042132 | A1 | 2/2020 | Kong et al. |
| 2020/0057507 | A1 | 2/2020 | Park et al. |
| 2020/0169007 | A1* | 5/2020 | Song et al. |
| 2020/0186179 | A1* | 6/2020 | Horiuchi et al. ...... H04B 1/385 |
| 2020/0259243 | A1* | 8/2020 | Jeon et al. ............. H01Q 1/243 |
| 2020/0371558 | A1 | 11/2020 | Kim et al. |
| 2020/0409421 | A1 | 12/2020 | Cho et al. |
| 2021/0294443 | A1* | 9/2021 | Kim et al. ............. G06F 3/044 |

FOREIGN PATENT DOCUMENTS

| | | |
|---|---|---|
| KR | 1020180122210 | 11/2018 |
| KR | 1020190070725 | 6/2019 |
| KR | 10-2019-0086305 | 7/2019 |
| KR | 10-2019-0106322 | 9/2019 |
| KR | 10-2019-0117026 | 10/2019 |
| KR | 10-2020-0014460 | 2/2020 |
| KR | 10-2020-0019804 | 2/2020 |

OTHER PUBLICATIONS (JP 3211702 U) »> Flexible Display Device Capable Of Sliding At The End Using The Elastic Force Of Flexible Display Means During Hinge Operation (see title) (Year: 2017).*

PCT/ISA/210 Search Report issued on PCT/KR2021/008540, Oct. 13, 2021, pp. 5.

PCT/ISA/237 Written Opinion issued on PCT/KR2021/008540, Oct. 13, 2021, pp. 4.

Korean Office Action dated Oct. 8, 2024 issued in counterpart application No. 10-2020-0096261, 15 pages.

* cited by examiner

ELECTRONIC DEVICE INCLUDING FLEXIBLE SLIDE-OUT DISPLAY

CROSS-REFERENCE TO RELATED APPLICATIONS

This application is a bypass continuation of International Application No. PCT/KR2021/008540 designating the United States, filed on Jul. 6, 2021 in the Korean Intellectual Property Receiving Office, which claims priority to Korean Patent Application No. 10-2020-0096261, filed on Jul. 31, 2020 in the Korean Intellectual Property Office, the disclosures of each of which are incorporated herein by reference in their entireties.

BACKGROUND

1. Field

The disclosure is related generally to an electronic device including a slide-out display, and more particularly, to an electronic device capable of detecting a lifting phenomenon of the flexible display.

2. Description of the Related Art

Electronic devices are provided in various forms, such as, for example, smart phones, tablet personal computers (PCs), and personal digital assistants (PDAs. Electronic devices are designed to provide a larger screen while having a portable size that does not inconvenience a user.

For example, the electronic device may be implemented to expand a screen in a sliding manner. A portion of a flexible display may be drawn out from an internal space of the electronic device by sliding, expanding the screen. However, a non-smooth screen may result from lifting due to the elasticity of the flexible display while the screen is expanded or retracted.

SUMMARY

Embodiments of the disclosure may provide an electronic device including a slide-out display capable of detecting a lifting phenomenon of the flexible display.

According to an aspect, an electronic device is provided that includes a housing, and a flexible display including a bendable section that may be extracted from an inner space of the housing. The electronic device also includes a support member positioned at least partially in the inner space of the housing and including a first surface facing the bendable section with a separation distance therebetween, and a dielectric disposed in the first surface while facing the bendable section and electrically connected to a ground. The electronic device further includes a sensor integrated circuit (IC) electrically connected to a touch sensing circuit included in the flexible display and configured to detect capacitance of a touch area facing the dielectric in the touch sensing circuit.

An electronic device including a slide-out display can detect a lifting phenomenon of a flexible display and provide a notification thereof, or can implement measures (e.g., tension adjustment for the flexible display) for solving the lifting phenomenon of the flexible display, so that reliability of the electronic device including the slide-out display can be improved.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
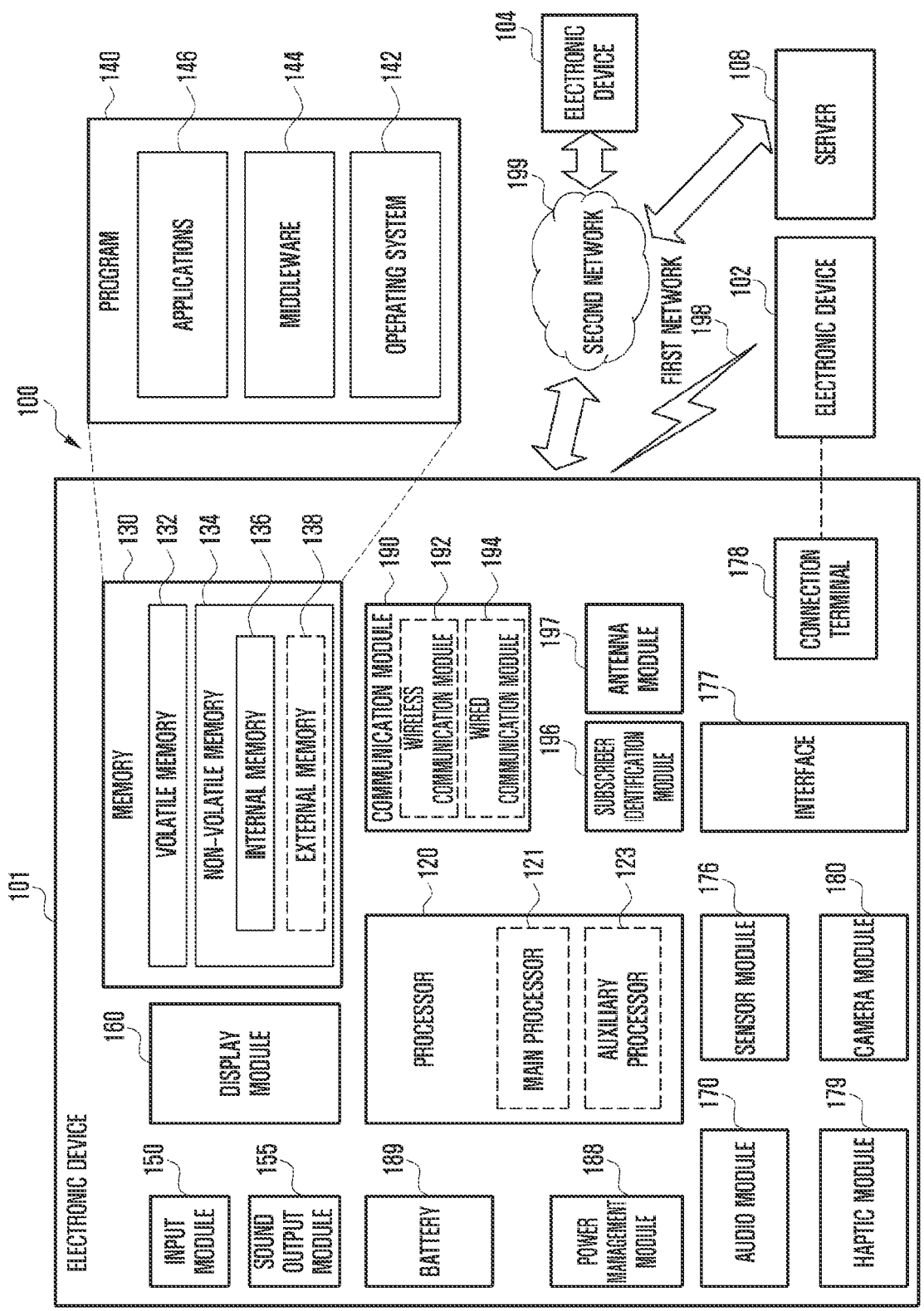
FIG. 1 is a block diagram of an electronic device in a network environment according to an embodiment.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure. The embodiments and the terms used therein are not intended to limit the technology disclosed herein to specific forms, and should be understood to include various modifications, equivalents, and/or alternatives to the corresponding embodiments. A singular expression may include a plural expression unless they are definitely different in a context.

FIG. 1 is a block diagram of an electronic device 101 in a network environment 100 according to an embodiment.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited to the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by a component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing records, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a $5^{th}$ generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas(e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (WPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may an ultra-low delay service using, for example, distributed computing or MEC. In another embodiment of disclosure, the external electronic device 104 may include an Internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
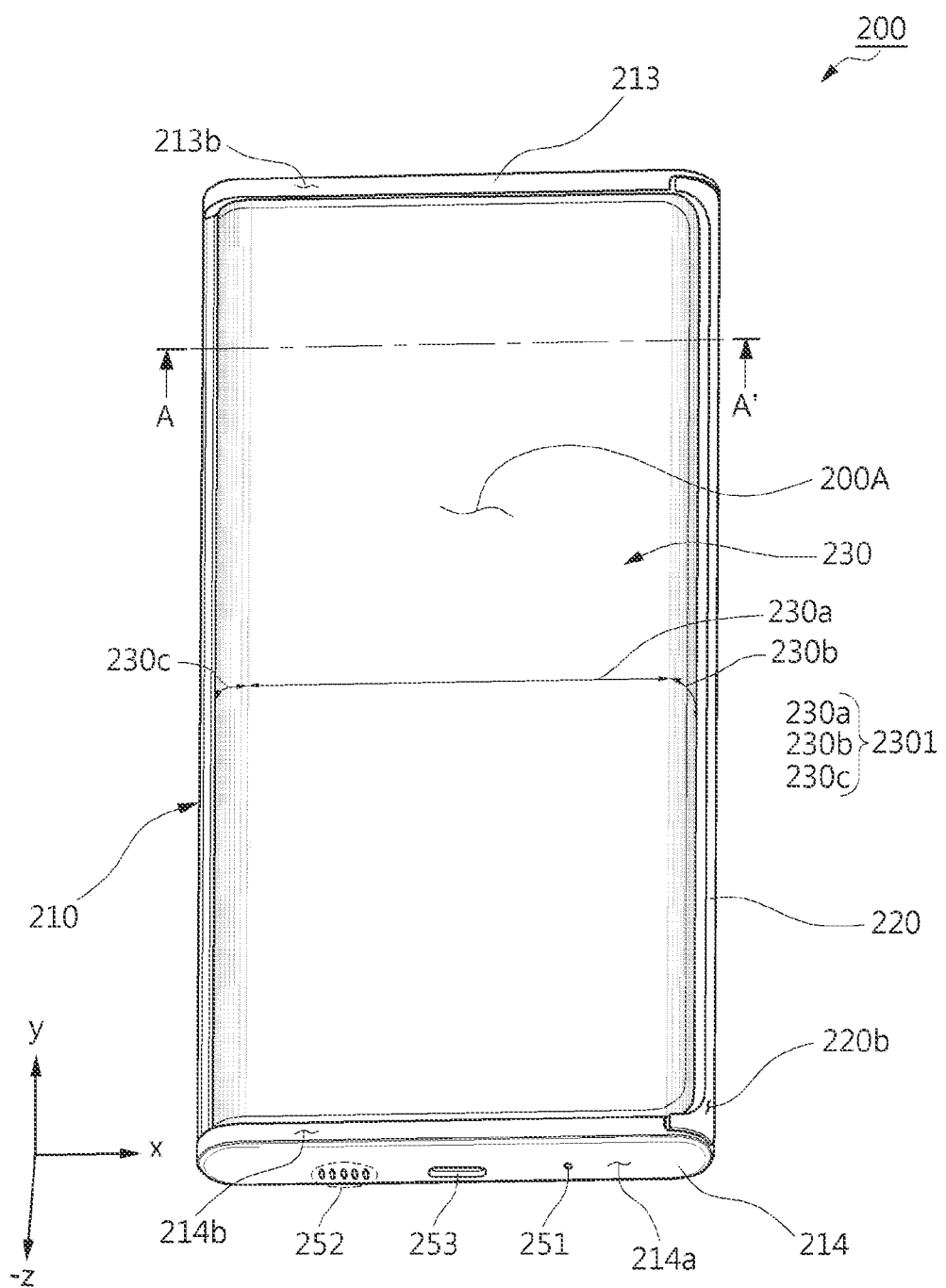
FIG. 2A is a diagram illustrating a front perspective view of an electronic device in a closed state, according to an embodiment.
Figure 2B:
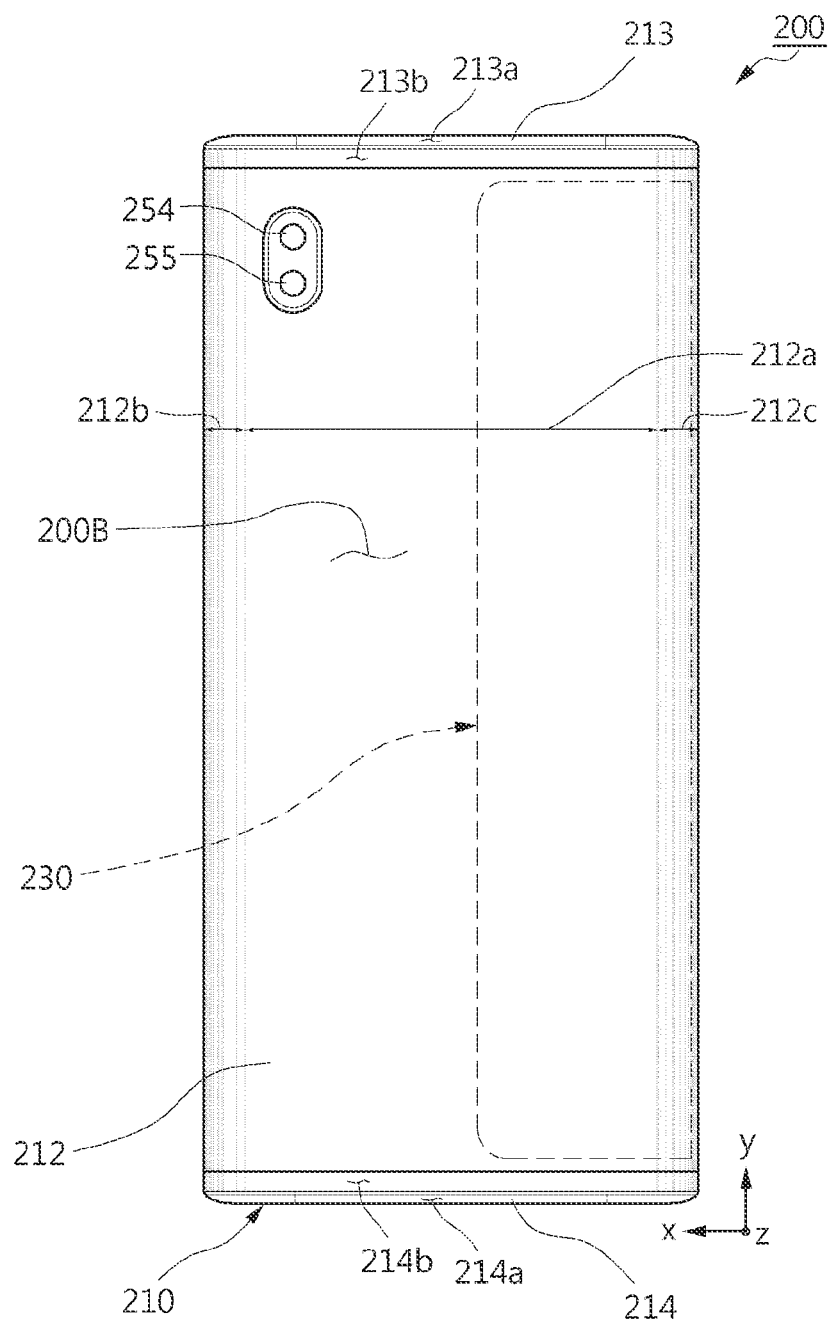
FIG. 2B is a diagram illustrating a rear perspective view of an electronic device in a closed state, according to an embodiment.
Figure 3A:
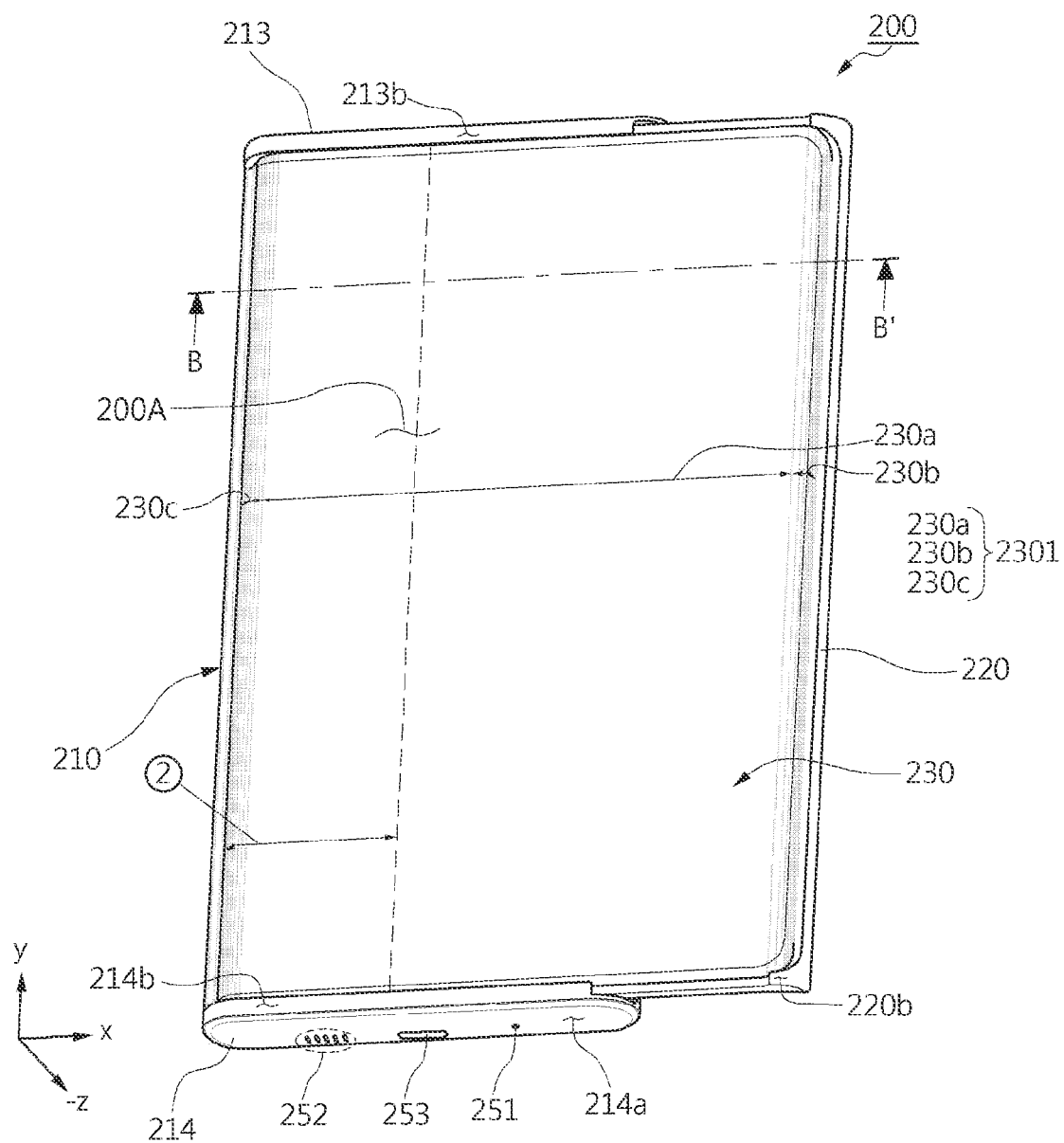
FIG. 3A is a diagram illustrating a front perspective view of an electronic device in an open state, according to an embodiment.
Figure 3B:
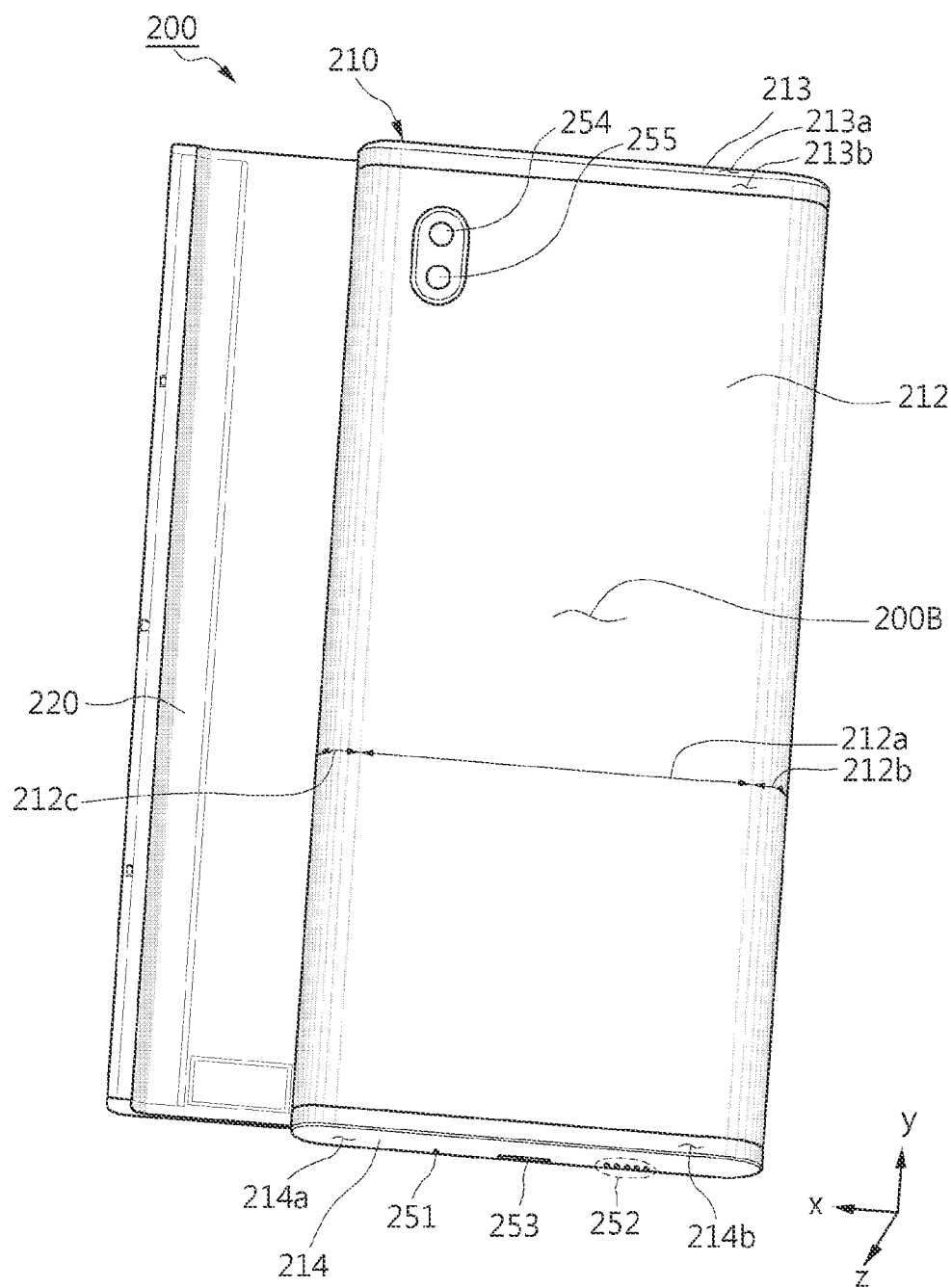
FIG. 3B is a diagram illustrating a rear perspective view of an electronic device in an open state, according to an embodiment.

FIG. 2A is a diagram illustrating a front perspective view of an electronic device in a closed state, according to an embodiment. FIG. 2B is a diagram illustrating a rear perspective view of an electronic device in a closed state, according to an embodiment. FIG. 3A is a diagram illustrating a front perspective view of an electronic device in an open state, according to an embodiment. FIG. 3B is a diagram illustrating a rear perspective view of an electronic device in an open state, according to an embodiment.

An electronic device 200 of FIG. 2A may include the electronic device 101 of FIG. 1.

Referring to FIGS. 2A, 2B, 3A, and 3B, the electronic device 200 may be implemented to expand a screen 2301 in a sliding manner. For example, the screen 2301 may be an externally visible area in the flexible display 230. FIGS. 2A and 2B illustrate the electronic device 200 in a state in which the screen 2301 is not expanded, and FIGS. 3A and 3B illustrate the electronic device 200 in a state in which the screen 2301 is expanded. A state in which the screen 2301 is not expanded is a state in which a sliding plate 220 for a sliding motion of the display 230 is not slid out, and may be referred to as a "closed state" hereinafter. The expanded state of the screen 2301 is a state in which the screen 2301 can no longer be expanded. Specifically, the screen is expanded to its maximum by sliding out the sliding plate 220, and may be referred to as an "open state" hereinafter. For example, slide-out may refer to at least a partial movement of the sliding plate 220 in a first direction (e.g., +x axis direction) when the electronic device 200 is switched from the closed state to the open state. The open state may be defined as a state in which the screen 2301 is expanded compared to the closed state, and screens of various sizes may be provided according to a moving position of the sliding plate 220. An intermediated state may refer to a state between the closed state of FIG. 2A and the open state of FIG. 3A. The screen 2301 may include an active area of the flexible display 230 that can output an image by visual exposure, and the electronic device 200 may adjust the active area according to a movement of the sliding plate 220 or a movement of the flexible display 230. Herein, the open state may indicate a state in which the screen 2301 is maximally expanded. The flexible display 230 that performs a sliding motion in the electronic device 200 of FIG. 2A to provide the screen 2301 may be referred to as a "slide-out display" or an "expandable display".

The electronic device 200 may include a sliding structure related to the flexible display 230. For example, when the flexible display 230 is moved to a preset distance by an external force, the flexible display 230 may be switched from a closed state to an open state or from an open state to a closed state without any further external force due to an elastic structure included in the sliding structure (e.g., semi-automatic slide motion).

When a signal is generated through an input device included in the electronic device 200, the electronic device 200 may be switched from a closed state to an open state or from an open state to a closed state by a driving device, such as, for example, a motor connected to the flexible display 230, For example, when a signal is generated through a hardware button or a software button provided through a screen, the electronic device 200 may be switched from a closed state to an open state or from an open state to a closed state.

When a signal is generated from various sensors, such as, for example, a pressure sensor, the electronic device 200 may be switched from a closed state to an open state, or from an open state to a closed state. For example, when carrying or holding the electronic device 200 by hand, a squeeze gesture in which a part of the hand (e.g., a palm or a finger of the hand) presses within a specified section of the electronic device 200 may be detected by the sensor, and the electronic device 200 may be switched from a closed state to an open state or from an open state to a closed state corresponding thereto.

The display 230 may include a second section ② (see FIG. 3A). When the electronic device 200 is switched from a closed state to an open state, the second section ② may include an extended portion of the screen 2301. When the electronic device 200 is switched from the closed state to the open state, the second section ② may be drawn from the internal space of the electronic device 200 by sliding. Thus, the screen 2301 may be expanded. When the electronic device 200 is switched from the open state to the closed state, at least a portion of the second section ② may be retracted into the internal space of the electronic device 200 by sliding. Thus, the screen 2301 may be reduced. When the electronic device 200 is switched from the open state to the closed state, at least a portion of the second section ② may be retracted into the internal space of the electronic device 200 while being bent. For example, the flexible display 230 may include a flexible substrate (e.g., plastic substrate) made of a polymer material including polyimide (PI) or polyester (PET). The second section ② is a bending portion of the flexible display 230 when the electronic device 200 is switched between an open state and a closed state, and may be referred to as, for example, a bendable section. Herein, the second section ② will be referred to as a bendable section.

The electronic device 200 may include a housing 210, a sliding plate 220, and/or a flexible display 230.

The housing (or case) 210 may include, for example, a back cover 212, a first side cover 213, and/or a second side cover 214. The back cover 212, the first side cover 213, or the second side cover 214 may be connected to a support member positioned inside the electronic device 200, and form at least a portion of an external shape of the electronic device 200.

The back cover 212 may form, for example, at least a portion of a rear surface 200B of the electronic device 200. The back cover 212 may be substantially opaque. For example, the back cover 212 may be made of coated or tinted glass, ceramic, polymer, metal (e.g., aluminum, stainless steel (STS), or magnesium), or a combination of at least two of the above materials. In a state in which the bendable section ② of the flexible display 230 is introduced into the inner space of the housing 210 (e.g., closed state), at least a portion of the bendable section ② may be disposed to be visible from the outside through the back cover 212. In this case, the back cover 212 may be made of a transparent material and/or a translucent material.

The back cover 212 may include a flat portion 212a and curved portions 212b and 212c positioned at opposite sides with the flat portion 212a interposed therebetween. The curved portions 212b and 212c may be formed adjacent to both relatively long edges, respectively, of the back cover 212 and be bent toward the screen positioned opposite to the back cover 212 to be extended seamlessly. The back cover 212 may include one of the curved portions 212b and 212c or may be implemented without the curved portions 212b and 212c.

The first side cover 213 and the second side cover 214 may be positioned opposite to each other. For example, the first side cover 213 and the second side cover 214 may be positioned opposite to each other with the flexible display 230 interposed therebetween in a second direction (e.g., y axis direction) orthogonal to the first direction (e.g., +x axis direction) that the sliding plate 220 slides out. The first side cover 213 may form at least a portion of a first side surface 213*a* of the electronic device 200, and the second side cover 214 may form at least a portion of a second side surface 214*a* of the electron device 200 facing in a direction opposite to the first side surface 213*a*. The first side cover 213 may include a first edge portion (or first rim) 213*b* extended from an edge of the first side surface 213*a*. For example, the first edge portion 213*b* may form at least a portion of one side bezel of the electronic device 200. The second side cover 214 may include a second edge portion (or second rim) 214*b* extended from an edge of the second side surface 214*a*. For example, the second edge portion 214*b* may form at least a portion of the other side bezel of the electronic device 200. In the closed state of FIG. 2A, a surface of the first edge portion 213*b*, a surface of the second edge portion 214*b*, and a surface of the sliding plate 220 may be smoothly connected to form one side curved portion corresponding to a first curved portion 230*b* side of the screen 2301. The surface of the first edge portion 213*b* or the surface of the second edge portion 214*b* may include the other side curved portion corresponding to a second curved portion 230*c* side of the screen 2301, positioned at the opposite side of the first curved portion 230*b*.

The sliding plate 220 may perform a sliding motion on a support member positioned inside the electronic device 200. At least a portion of the flexible display 230 may be disposed in the sliding plate 220, and the closed state of FIG. 2A or the open state of FIG. 3A may be formed based on a position of the sliding plate 220 on the support member. The flexible display 230 may be attached to the sliding plate 120 through an adhesive member. The adhesive member may include a thermally responsive adhesive member, a photoreactive adhesive member, a general adhesive, and/or a double-sided tape. The flexible display 230 may be inserted into a recess formed in the sliding plate 220 in a sliding manner to be disposed at and fixed to the sliding plate 220. The sliding plate 230 may serve to support at least a portion of the flexible display 230, and be referred to as a display support structure in some embodiments.

The sliding plate 220 may perform a sliding motion on a support member positioned inside the electronic device 200. At least a portion of the flexible display 230 may be disposed in the sliding plate 220, and the closed state of FIG. 2A or the open state of FIG. 3A may be formed based on a position of the sliding plate 220 on the support member. The flexible display 230 may be attached to the sliding plate 220 through an adhesive member. The adhesive member may include a thermally responsive adhesive member, a photoreactive adhesive member, a general adhesive, and/or a double-sided tape. The flexible display 230 may be inserted into a recess formed in the sliding plate 220 in a sliding manner to be disposed at and fixed to the sliding plate 220. The sliding plate 220 may serve to support at least a portion of the flexible display 230, and be referred to as a display support structure in some embodiments.

Due to the sliding out of the sliding plate 220, while at least a portion of the bendable section ② comes out from inside of the electronic device 200, a state (e.g., open state) in which the screen 2301 is expanded may be provided, as illustrated in FIG. 3A.

In the closed state of FIG. 2A, the screen 2301 may include a flat portion 230*a* and a first curved portion 230*b* and/or a second curved portion 230*c* positioned in opposite sides with the flat portion 230*a* interposed therebetween. For example, the first curved portion 230*b* and the second curved portion 230*c* may be substantially symmetrical with the flat portion 230*a* interposed therebetween. For example, in the closed state of FIG. 2A, the first curved portion 230*b* and/or the second curved portion 230*c* may be positioned to correspond to the curved portions 212*b* and 212*c*, respectively, of the back cover 212 and be bent toward the back cover 212. When the electronic device 200 is switched from the closed state of FIG. 2A to the open state of FIG. 3A, the flat portion 230*a* may be expanded. For example, a partial area of the bendable section ② forming the second curved portion 230*c* in the closed state of FIG. 2A may be included in an expanded flat portion 230*a* when the electronic device 200 is switched from the closed state of FIG. 2A to the open state of FIG. 3A and be formed as another area of the bendable section ②.

The electronic device 200 may include an opening for entering or withdrawing the bendable section ②, and/or a pulley positioned in the opening. The pulley may be positioned to correspond to the bendable section ②, and a movement of the bendable section ② and a direction of movement thereof may be guided through a rotation of the pulley in a switch between the closed state of FIG. 2A and the open state of FIG. 3A. The first curved portion 230*b* may be formed to correspond to a curved surface formed in one surface of the sliding plate 220. The second curved portion 230*c* may be formed by a portion corresponding to the curved surface of the pulley in the bendable section ②. The first curved portion 230*b* may be positioned opposite to the second curved portion 230*c* in the closed state or the open state of the electronic device 200 to improve an aesthetic impression of the screen 2301. The flat portion 230*a* may be implemented in an expanded form without the first curved portion 230*b*.

The flexible display 230 may further include a touch sensing circuit (e.g., touch sensor). The flexible display 230 may be coupled to a pressure sensor capable of measuring the intensity (pressure) of a touch, and/or a digitizer that detects a magnetic field type pen input device (e.g., stylus pen) or may be disposed adjacent thereto. For example, the digitizer may include a coil member disposed on a dielectric substrate so as to detect a resonance frequency of an electromagnetic induction method applied from the pen input device.

The electronic device 200 includes a microphone hole 251, a speaker hole 252, a connector hole 253, a camera module 254 (e.g., the camera module 180 of FIG. 1), and/or a flash 255. The flash 255 may be included in the camera module 254. In some embodiments, the electronic device 200 may omit at least one of the components or additionally include other components.

The microphone hole 251 may be formed, for example, in at least a portion of the second side surface 214*a* corresponding to a microphone positioned inside the electronic device 200. A position of the microphone hole 251 is not limited to the embodiment of FIG. 2A and may vary. The electronic device 200 may include a plurality of microphones capable of detecting a direction of a sound.

The speaker hole 252 may be formed, for example, in at least a portion of the second side surface 214*a* corresponding to a speaker positioned inside the electronic device 200. A position of the speaker hole 252 is not limited to the embodiment of FIG. 2A and may vary. The electronic device 200 may include a receiver hole for a call. The microphone hole 251 and the speaker hole 252 may be implemented as one hole, or the speaker hole 252 may be omitted as in a piezo speaker.

The connector hole 253 may be formed, for example, in at least a portion of the second side surface 214*a* corresponding to a connector (e.g., USB connector) positioned inside the electronic device 200. The electronic device 200 may transfer and/or receive power and/or data to and/or from an external electronic device electrically connected to the connector through the connector hole 253. A position of the connector hole 253 is not limited to the embodiment of FIG. 2A and may vary.

The camera module 254 and the flash 255 may be positioned, for example, at the rear surface 200B of the electronic device 200. The camera module 154 may include one or more lenses, an image sensor, and/or an image signal processor. The flash 255 may include, for example, a light emitting diode or a xenon lamp. Two or more lenses (IR cameras, wide angle lens, and telephoto lens) and image sensors may be positioned at one surface of the electronic device 200. The disclosure is not limited to the embodiment of FIG. 2B or FIG. 3B, and the electronic device 200 may include a plurality of camera modules. The camera module 254 may be one of a plurality of camera modules. For example, the electronic device 200 may include a plurality of camera modules (e.g., dual camera or triple camera) each having different properties (e.g., angle of view) or functions. For example, a plurality of camera modules (e.g., the camera modules 254) including lenses having different angles of view may be configured, and the electronic device 200 may control to change an angle of view of the camera module to be performed in itself based on a user's selection. Further, the plurality of camera modules may include at least one of a wide angle camera, a telephoto camera, a color camera, a monochrome camera, or an IR camera (e.g., time of flight (TOF) camera, structured light camera). The IR camera may be operated as at least a portion of a sensor module.

The electronic device 200 may further include a camera module (e.g., front camera) that generates an image signal based on light received through one surface (e.g., a front surface 200A) of the electronic device 200 placed in a direction in which the screen 2301 faces. For example, the camera module 254 is not limited to the embodiment of FIG. 2B or FIG. 3B, and may be aligned with an opening (e.g., through hole or notch) formed in the flexible display 230 to be positioned inside the housing 210. The camera module 254 may receive light through the opening and a partial area of a transparent cover overlapped with the opening to generate an image signal. The transparent cover may serve to protect the flexible display 230 from the outside, and include, for example, a material such as polyimide or ultra thin glass (UTG).

The disclosure is not limited to the embodiment of FIG. 2B or FIG. 3B, and the camera module 254 may be disposed at the bottom of at least a portion of the screen 2301 of the flexible display 230, and the camera module 254 may perform a related function (e.g., image taking) without visually distinguishing (or exposing) a position thereof. For example, when viewed from above the screen 2301 (e.g., when viewed in a −z axis direction), the camera module 254 may be disposed to overlap at least a portion of the screen 2301 and obtain an image of an external subject while not being exposed to the outside.

The electronic device 200 may further include a key input device the input module 150 of FIG. 1). The key input device may be positioned, for example, at the first side surface 213a of the electronic device 200 formed by the first side cover 213. The key input device may include at least one sensor module.

The electronic device 200 may include various sensor modules (e.g., the sensor module 176 of FIG. 1). The sensor module may generate an electrical signal or data value corresponding to an internal operating state or an external environmental state of the electronic device 200. For example, the sensor module may include a proximity sensor that generates a signal regarding proximity of an external object based on light received through the front surface 200A of the electronic device 200 placed in a direction in which the screen 2301 faces. In another example, the sensor module may include various biometric sensors such as a fingerprint sensor or a heart rate monitor (HRM) sensor for detecting biometric information based on light received through the front surface 200A or the rear surface 200B of the electronic device 200. The electronic device 200 may include various other sensor modules, for example, at least one of a gesture sensor, a gyro sensor, an atmospheric sensor, a magnetic sensor, an acceleration sensor, a grip sensor, a color sensor, an IR sensor, a biometric sensor, a temperature sensor, a humidity sensor, or an illuminance sensor.

The disclosure is not limited to the embodiments of FIGS. 2A, 2B, 3A, and 3C, and the electronic device 200 may be implemented in a structure in which a screen toward the third edge portion 220b is extended when the sliding plate 220 slides out. For example, a partial area of the flexible display 230 forming the first curved portion 230b in the closed state of FIG. 2A may be included in an expanded flat part 230a when the electronic device 200 is switched from the closed state of FIG. 2A to the open state of FIG. 3A, and be formed in another area of the flexible display 230.

Figure 4:
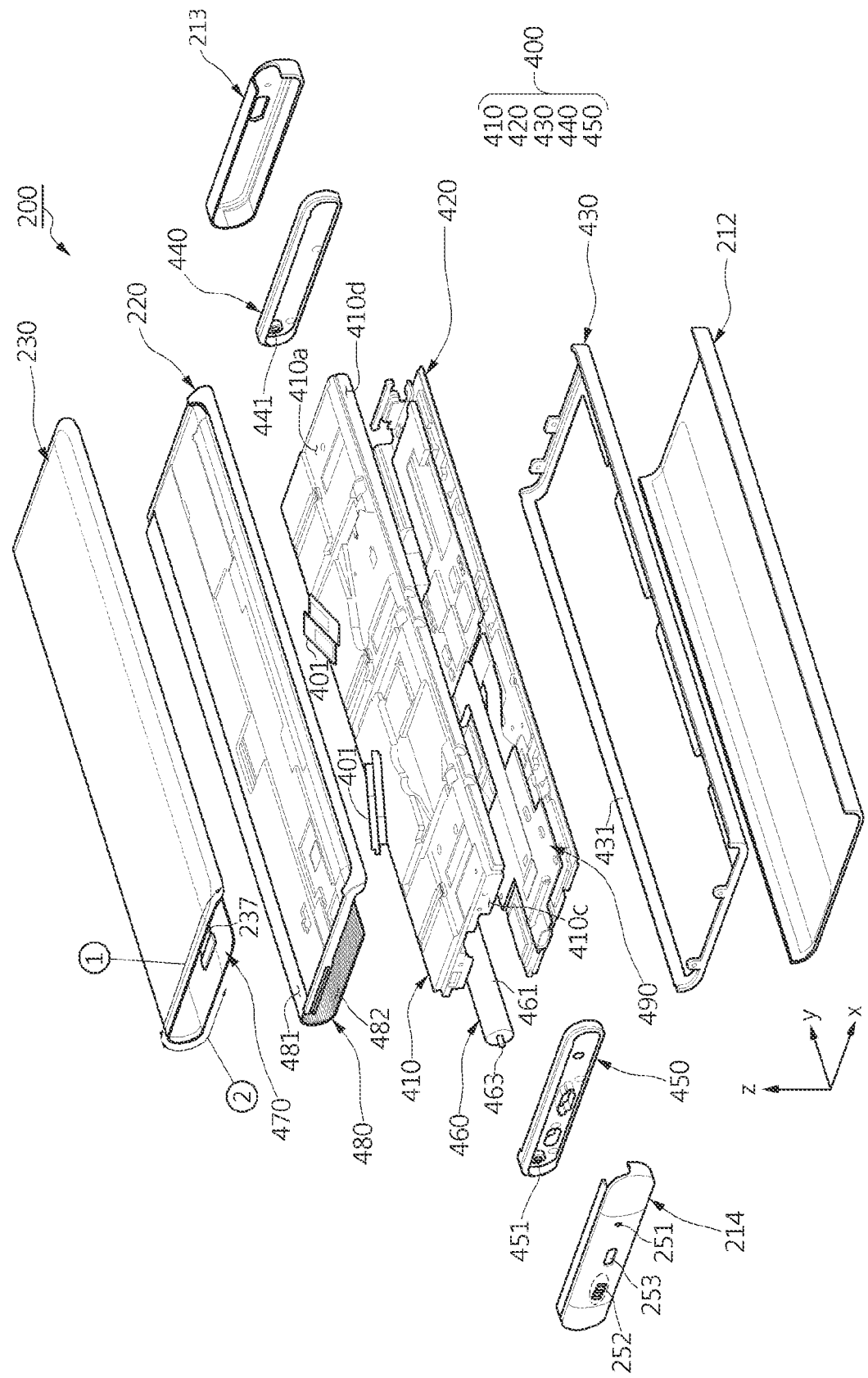
FIG. 4 is a diagram illustrating an exploded perspective view of the electronic device of FIG. 2A, according to an embodiment.

FIG. 4 is a diagram illustrating an exploded perspective view of the electronic device 200 of FIG. 2A, according to an embodiment.

Referring to FIG. 4, the electronic device 200 includes the back cover 212, the first side cover 213, the second side cover 214, a support member assembly 400, a pulley 460, the sliding plate 220, the flexible display 230, a support sheet 470, a multi-bar structure (or multi-bar assembly) 480, and a printed circuit board (PCB) 490 (e.g., a flexible PCB (FPCB) or a rigid-flex PCB (RFPCB)). Descriptions of elements described in detail above may be omitted in the description below for readability and conciseness.

The support member assembly (or support structure) 400 is a frame structure capable of withstanding a load, and may contribute to durability or rigidity of the electronic device 200. At least a portion of the support member assembly 400 may include a non-metallic material (e.g., polymer) or a metallic material. A housing 210 (see FIG. 2A) including a back cover 212, a first side cover 213, or a second side cover 214, the pulley 460, a sliding plate 220, and a flexible display 230, the support sheet 470, the multi-bar structure 480, or the PCB 490 may be disposed at or coupled to the support member assembly 400.

The support member assembly 400 includes a first support member 410, a second support member 420, a third support member 430, a fourth support member 440, or a fifth support member 450.

The first support member (or first bracket) 410 may be, for example, in the form of a plate. The sliding plate 220 may be disposed in one surface 410a of the first support member 410. The second support member (or second bracket) 420 may be, for example, in the form of a plate overlapped with at least a portion of the first support member 410 when viewed in the z-axis direction, or may be coupled to the first support member 410 and/or the third support member 430. The second support member 420 may be interposed between the first support member 410 and the third support member 430. The third support member 430 may be coupled to the first support member 410 and/or the second support member 420 with the second support member 420 interposed therebetween. The PCB 490 may be disposed in the second support member 420 between the first support member 410 and the second support member 420. The fourth support member 440 may be coupled to one side of an assembly (or structure) to which the first support member 410, the second support member 420, and the third support member 430 are coupled.

The fifth support member 450 may be coupled to the other side of an assembly (or structure) to which the first support member 410, the second support member 420, and the third support member 430 are coupled, and be positioned opposite to the fourth support member 440. The first side cover 213 may be coupled to the support member assembly 400 at the fourth support member 440 side. The second side cover 214 may be coupled to the support member assembly 400 at the fifth support member 450 side. The back cover 212 may be coupled to the support member assembly 400 at the third support member 430 side. At least a portion of the first support member 410, the second support member 420, the third support member 430, the fourth support member 440, or the fifth support member 450 may include a metallic material and/or a non-metallic material (e.g., polymer). At least two of the first support member 410, the second support member 420, the third support member 430, the fourth support member 440, or the fifth support member 450 may be integrally implemented. The support member assembly 400 may refer to a structure forming at least a portion of the first support member 410, the second support member 420, the third support member 430, the fourth support member 440, or the fifth support member 450. One or more of the first support member 410, the second support member 420, the third support member 430, the fourth support member 440, and the fifth support member 450 may be omitted.

The first support member 410 may include, for example, a first side surface facing the fourth support member 440, a second side surface 410c facing the fifth support member 450 and positioned opposite to the first side surface, a third side surface connecting one end portion of the first side surface and one end portion of the second side surface 410c, and a fourth side surface 410d connecting the other end portion of the first side surface and the other end portion of the second side surface 410c and positioned opposite to the third side surface. The pulley 460 may be positioned near the third side of the first support member 410. In another example, in the case of an electronic device in which the slide-out direction is reversed, the pulley 460 may be positioned near the fourth side surface 410d of the first support member 460, The pulley 460 may include a cylindrical roller 461 extended in a direction (e.g., +y-axis direction) from the fifth support member 450 to the fourth support member 440. The pulley 460 may include a first rotation shaft and a second rotation shaft 463 connected to the roller 461, and the first rotation shaft and the second rotation shaft 463 may be positioned at opposite sides with the roller 461 interposed therebetween. The first rotation shaft may be interposed between the roller 461 and the first side cover 213, and be connected to the fourth support member 440. The second rotation shaft 463 may be interposed between the roller 461 and the second side cover 214, and be connected to the fifth support member 450. The fourth support member 440 may include a first through hole 441 into which the first rotation shaft is inserted, and the fifth support member 450 may include a second through hole 451 into which the second rotation shaft 463 is inserted. The roller 461 may be rotatable based on the first rotation shaft disposed in the fourth support member 440 and the second rotation shaft 463 disposed in the fifth support member 450.

The sliding plate 220 may be disposed in the support member assembly 400 to perform a sliding motion on the first support member 410. For example, a sliding structure for supporting and guiding coupling of the first support member 410 and the sliding plate 220 and a movement of the sliding plate 220 may be provided between the first support member 410 and the sliding plate 220. The sliding structure may include at least one elastic structure 401. When the sliding plate 220 is moved to a preset distance by an external force, due to the at least one elastic structure 401, the closed state of FIG. 2A may be switched to the open state of FIG. 3A or the open state may be switched to the closed state without any further external force. The at least one elastic structure 401 may include various elastic members such as, for example, a torsion spring. For example, the torsion spring as the elastic structure 401 may include one end portion connected to the sliding plate 220, the other end portion connected to the first support member 410, and a spring portion between the one end portion and the other end portion. When the sliding plate 220 is moved by an external force to a preset distance sliding out in a first direction (e.g., +x axis direction), a position of the one end with respect to the other end portion is changed so that the sliding plate 220 may be moved in the first direction due to elasticity of the spring portion without any further external force. Thus, the electronic device 200 may be switched from the closed state of FIG. 2A to the open state of FIG. 3A. When the sliding plate 220 is moved by an external force to a preset distance in a second direction (e.g., −x axis direction) opposite to the first direction, a position of the one end portion with respect to the other end portion is changed. Thus, the sliding plate 220 may be moved in the second direction due to elasticity of the spring portion without any further external force, whereby the electronic device 200 may be switched from the open state of FIG. 3A to the closed state of FIG. 2A.

The housing 210 may be defined to further include at least a portion of the support member assembly 400. For example, the housing 210 includes the one surface 410a formed by one surface (e.g., the first support member 410) facing in the first direction (e.g., +z axis direction) and the other surface (e.g., the rear surface 200B of FIG. 2B) facing in a second direction (e.g., −z axis direction) opposite to that of the one surface 410a. The display support structure 220 may be slidably disposed at the one surface 410a formed by one surface (e.g., the first support member 410) of the housing 210 in a third direction (e.g., x-axis direction) perpendicular to the first direction.

The flexible display 230 includes a first section ① extended from the bendable section ②. The first section ① may be disposed in the sliding plate 220. When the electronic device 200 is switched from the closed state of FIG. 2A to the open state of FIG. 3A, while the bendable section ② connected to the first section ① slides out due to the movement of the sliding plate 220, the screen 2301 may be extended. When the electronic device 200 is switched from the open state of FIG. 2A to the closed state of FIG. 3A, due to the movement of the sliding plate 220, while at least a portion of the bendable section ② retracts into the electronic device 200, the screen 2301 may be reduced. The support member assembly 400 may include an opening for entering or withdrawing the bendable section ②, and the pulley 460 may be positioned in the opening. The opening may include a gap of one side between the first support member 410 and the third support member 430, and a portion 431 of the third support member 430 adjacent to the opening may have a curved shape corresponding to a curved surface of the roller 461. The pulley 460 may be positioned to correspond to the bendable section ②, and in a switch between the closed state of FIG. 2A and the open state of FIG. 3A, the pulley 460 may rotate by the movement of the bendable section ②.

The support sheet 470 may be attached to the rear surface of the flexible display 230. The rear surface of the flexible display 230 may refer to a surface positioned opposite to a surface in which light is emitted from a display panel including a plurality of pixels. The support sheet 470 may contribute to durability of the flexible display 230. The support sheet 470 may reduce an effect of a load or stress that may occur in a switch between the closed state of FIG. 2A and the open state of FIG. 3A on the flexible display 230. When the sliding plate 220 is moved, the support sheet 470 may prevent the flexible display 230 from being damaged by a force transferred therefrom. The flexible display 230 may include a first layer including a plurality of pixels and a second layer coupled to the first layer. The first layer may include, for example, a light emitting layer (e.g., display panel) including a plurality of pixels implemented with a light emitting element such as an organic light emitting diode (OLED) or a micro light emitting diode (LED), and other various layers (e.g., an optical layer for improving a picture quality or outdoor visibility of a screen, such as a polarization layer). The optical layer may selectively transmit light generated from a light source of the light emitting layer and vibrating in a predetermined direction. When viewed from above the screen 2301 (e.g., when viewed in the −z axis direction), in a partial area of the flexible display 230 at least partially overlapped with at least one electronic component (e.g., camera module or sensor module) included in the electronic device 200, a plurality of pixels may not be disposed. When viewed from above the screen 2301, a partial area of the flexible display 230 at least partially overlapped with at least one electronic component (e.g., camera module or sensor module) included in the electronic device 200 may include different pixel structures and/or wiring structures compared to other areas. For example, a partial area of the flexible display 230 at least partially overlapped with the at least one electronic component (e.g., camera module or sensor module) may have a pixel density different from that of other areas. For example, although a partial area of the flexible display 230 at least partially overlapped with the at least one electronic component (e.g., camera module or sensor module) does not include an opening, the partial area may be implemented as a substantially transparent area formed by a change of a pixel structure and/or a wiring structure. The second layer may include various layers that serve to support and protect the first layer (e.g., cushioning member), to block light, to absorb or shield electromagnetic waves, or to diffuse, dissipate, or radiate a heat. At least a portion of the second layer is a conductive member (e.g., metal plate), which can help to reinforce rigidity of the electronic device 200 and be used for shielding ambient noise and dissipating a heat emitted from peripheral heat dissipating components (e.g., display driving circuits). The conductive member may include at least one of copper (Cu), aluminum (Al), stainless steel (SUS), or CLAD (e.g., a stacked member in which SUS and Al are alternately disposed).

The support sheet 470 may cover at least a portion of the second layer of the flexible display 230 and be attached to the rear surface of the second layer. The support sheet 470 may be made of various metallic materials and/or non-metallic materials (e.g., polymer). The support sheet 470 may include stainless steel. The support sheet 470 may include engineering plastic. The support sheet 470 may be implemented integrally with the flexible display 230. The support sheet 470 may include a lattice structure at least partially overlapped with a portion in which the flexible display 230 is bent and disposed (e.g., the bendable section ② of FIG. 3A or FIG. 4, the first curved portion 230b of FIG. 2A or FIG. 3A)). The lattice structure may include a plurality of openings or a plurality of slits, and contribute to flexibility of the flexible display 230. The support sheet 470 may include a recess pattern including a plurality of recesses instead of the lattice structure, and the recess pattern may contribute to flexibility of the flexible display 230. The lattice structure or the recess pattern may be extended to at least a portion of the flat portion 230a of FIG. 2A or FIG. 3A. The support sheet 470 including a lattice structure or a recess pattern, or a conductive member corresponding thereto may be formed in a plurality of layers.

The multi-bar structure 480 may be connected to the sliding plate 220 and include a first surface 481 facing the support sheet 470 and a second surface 482 positioned opposite to the first surface 481. When the sliding plate 220 moves, a movement and direction of the multi-bar structure 480 may be guided by the roller 461 that rotates by friction with the second surface 482. The second surface 482 may include an arrangement form of a plurality of bars extended in a direction (e.g., +y-axis direction) from the second rotation shaft 463 of the pulley 460 to the first rotation shaft. The multi-bar structure 480 may be bent at portions having a relatively thin thickness between the plurality of bars. Such a multi-bar structure 480 may be referred to as other terms such as "flexible track" and "hinge rail".

In the closed state of FIG. 2A or the open state of FIG. 3A, at least a portion of the multi-bar structure 480 may be positioned to overlap the screen 2301 (see FIG. 2A or FIG. 3A), and support the bendable section ② so that the bendable section ② of the flexible display 230 is maintained in a smoothly connected form to the first section ① of the flexible display 230 without lifting. The multi-bar structure 480 may contribute so that the bendable section ② may move while maintaining a smoothly connected form to the first section ① without lifting in a switch between the closed state of FIG. 2A and the open state of FIG. 3A.

The support sheet 470 may enable elements (e.g., the multi-bar structure 380) positioned inside the electronic device 200 to be substantially invisible through the flexible display 230.

In an expanded state (e.g., the open state of FIG. 3A) of the screen, a non-smooth screen may be provided by lifting due to elasticity of the flexible display 230 and/or the support sheet 470. In order to prevent this, a tension structure for the flexible display 230 and/or the support sheet 470 may be provided. The tension structure may contribute to a smooth slide operation while maintaining tension.

In the PCB 490, a processor (e.g., the processor 120 of FIG. 1), a memory (e.g., the memory 130 of FIG. 1), and/or an interface (e.g., the interface 177 of FIG. 1) may be mounted. The processor may include, for example, one or more of a central processor, an application processor, a graphic processor, an image signal processor, a sensor hub processor, and a communication processor.

The memory may include, for example, a volatile memory or a non-volatile memory. The interface may include, for example, a high definition multimedia interface (HDMI), a universal serial bus (USB) interface, an SD card interface, and/or an audio interface. The interface may, for example, electrically or physically connect the electronic device 200 to an external electronic device, and include a USB connector, an SD card/MMC connector, or an audio connector.

The electronic device 200 may include various other elements disposed in the PCB 490 or electrically connected to the PCB 490. For example, the electronic device 200 may include a battery interposed between the first support member 410 and the second support member 420 or between the second support member 420 and the back cover 212. The battery is a device for supplying power to at least one component of the electronic device 200, and may include, for example, a non-rechargeable primary battery, a rechargeable secondary battery, or a fuel cell. The battery may be integrally disposed inside the electronic device 200 or may be detachably disposed from the electronic device 200. The electronic device 200 may include an antenna interposed between the first support member 410 and the second support member 420, or between the second support member 420 and the back cover 212. The antenna may include, for example, a near field communication (NFC) antenna, a wireless charging antenna, and/or a magnetic secure transmission (MST) antenna. The antenna may, for example, perform short range communication with an external device or wirelessly transmit and receive power required for charging. An antenna structure may be formed by a part of the first side cover 213 and/or the second side cover 214 or a combination thereof.

The electronic device 200 may include an FPCB 237 electrically connecting the flexible display 230 and the PCB 490. For example, the FPCB 237 may be electrically connected to the PCB 490 through an opening formed in the sliding plate 220 and an opening formed in the first support member 410.

Figure 5:
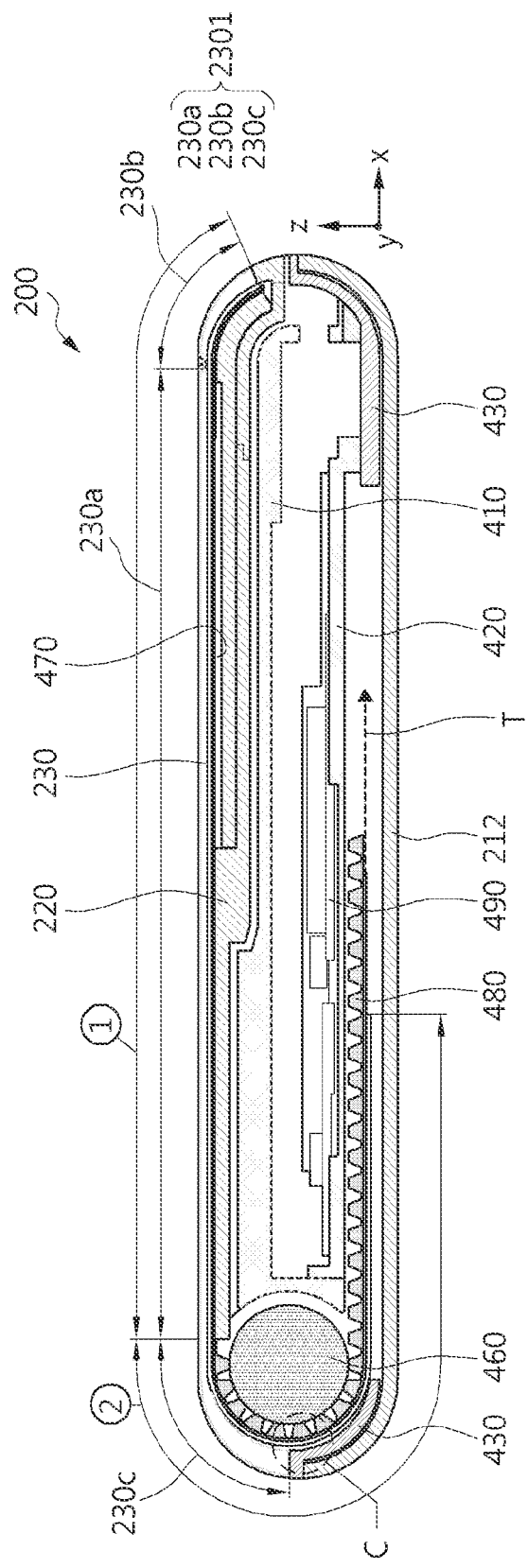
FIG. 5 is a diagram illustrating a cross-sectional view of a portion of the electronic device taken along line A-A' in the electronic device in a closed state of FIG. 2A, according to an embodiment.
Figure 6:
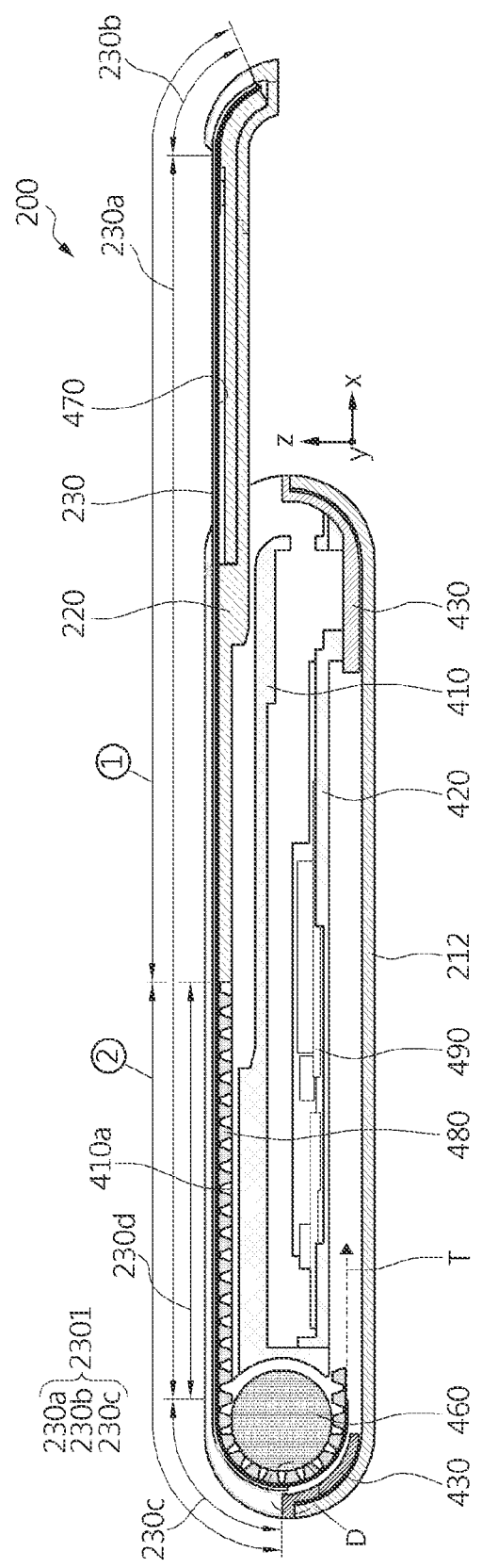
FIG. 6 is a diagram illustrating a cross-sectional view of a portion of the electronic device taken along line B-B' in the electronic device in an open state of FIG. 3A, according to an embodiment.

FIG. 5 is a diagram illustrating a cross-sectional view of a portion of the electronic device 200 taken along line A-A' of the electronic device 200 in the closed state of FIG. 2A, according to an embodiment. FIG. 6 is a diagram illustrating a cross-sectional view of a portion of the electronic device 200 taken along line B-B' of the electronic device 200 in an open state of FIG. 3A, according to an embodiment.

Referring to FIGS. 5 and 6, the electronic device 200 may include the back cover 212, the first support member 410, the second support member 420, the third support member 430, the sliding plate 220, the flexible display 230, the support sheet 470, the multi-bar structure 480, the PCB 490, and/or the pulley 460. Descriptions of elements already described in detail above may be omitted in the description below for readability and conciseness.

The sliding plate 220 may be disposed on the first support member 410 capable of sliding out. The flexible display 230 may include the first section ① and the bendable section ②. In a closed state of FIG. 5 or an open state of FIG. 6, the screen 2301 may include the flat portion 230a and the first curved portion 230b and the second curved portion 230c positioned at opposite sides with the flat portion 230a interposed therebetween. The first section ① may be disposed along the flat portion 230a and the first curved portion 230b of the screen 2031. The bendable section ② may be extended from the first section ①, and be drawn out from an internal space of the electronic device 200 when the sliding plate 220 slides out. The first curved portion 230b may be formed to correspond to a curved surface formed in one surface of the sliding plate 220. The second curved portion 230c may be formed by a portion corresponding to a curved surface of the pulley 460 in the bendable section C2).

The support sheet 470 may be disposed in the rear surface of the flexible display 230. The support sheet 470 may be included in the flexible display 230. The pulley 460 may be positioned inside the electronic device 200 and be connected to the bendable section ② of the flexible display 230. The multi-bar structure 480 may be extended from the sliding plate 220 to between the support sheet 470 and the pulley 460. The multi-bar structure 480 may contribute so that the bendable section ② may move while maintaining a smoothly connected form to the first section ① without lifting in a switch between the closed state of FIG. 5 and the open state of FIG. 6. In the closed state of FIG. 5 or the open state of FIG. 6, a portion of the bendable section ② may form a second curved portion 230c of the screen 2301, and the second curved portion 130c may be supported by the multi-bar structure 480 between the pulley 460 and the bendable sections ② to be smoothly connected to the first section ① without lifting. In the open state of FIG. 6, a portion 230d of the bendable section ② may form a portion of the flat part 230a of the screen 2301, and be supported by the multi-bar structure 480 between the one surface 410a of the first support member 410 and the bendable section ② to be smoothly connected to the first section ① without lifting.

A curved member including a curved portion with which the multi-bar structure 480 comes into contact may be disposed instead of the pulley 460. For example, in a switch between the closed state of FIG. 5 and the open state of FIG. 6, the multi-bar structure 480 may be slid with respect to the curved portion. In order to reduce friction between the curved portion and the multi-bar structure 480, a surface of the curved portion or a surface of the multi-bar structure 480 may be surface-treated. The curved member may be connected to the support structure 400 of FIG. 4. The pulley 460 may be defined as a curved member rotatably implemented based on friction with the multi-bar structure 480A rail part for guiding a movement of the multi-bar structure 480 by being formed along the curved portion of the curved member or replacing the curved member may be implemented. The rail part may be, for example, formed in the housing 210 of FIG. 2A or the support member assembly 400 of FIG. 4. The fourth support member 440 may include a first rail part for guiding a movement of the multi-bar structure 480 by inserting one side portion of the multi-bar structure 480. The fifth support member 450 may include a second rail part for guiding a movement of the multi-bar structure 480 by inserting the other side portion of the multi-bar structure 480.

The disclosure is not limited to the embodiment of FIG. 4, 5, or 6, and when the sliding plate 220 slides out, the electronic device 200 may be implemented in a form in which the screen is expanded as a portion (e.g., the bendable section ②) of the flexible display 230 is unfolded while coming out in a state rolled up by a roller positioned inside the electronic device 200.

The bendable section ② of the flexible display 230, a bendable section of the support sheet 470 corresponding to the bendable section ②, and the multi-bar structure 480 may be connected to the pulley 460. A movement and movement direction of the bendable section ② of the flexible display 230, the bendable section of the support sheet 470, and the multi-bar structure 480 may be guided by the pulley 460. The multi-bar structure 480 may be in face-to-face contact with the roller 461 (see FIG. 4) of the pulley 460. The bendable section of the support sheet 470 may be interposed between the multi-bar structure 480 and the bendable section ② of the flexible display 230. The bendable section of the support sheet 470 does not directly face-to-face contact with the pulley 460, but because the bendable section ② moves based on the rotation of the pulley 460 in a driving relationship with the pulley 460 corresponding to the multi-bar structure 480, it may be described that the bendable section ②is in a connected state (or drivingly connected state) with the pulley 460. The bendable section ② of the flexible display 230 does not directly face-to-face contact with the pulley 460, but because the bendable section ② moves based on a rotation of the pulley 460 in a driving relationship with the pulley 460 corresponding to the multi-bar structure 480 and the bendable section of the support sheet 470, it may be described that the bendable section ② is in a connected state (or a drivingly connected state) with the pulley 460.

The electronic device 200 may include a tension structure (or tension device) for the flexible display 230 and/or the support sheet 470. The tension structure may be, for example, connected to the support sheet 470 to provide tension (or tension force) T to the flexible display 230 and/or the support sheet 470 in a driving connection state with the pulley 460. The tension structure may apply tension T to the support sheet 470 attached to the flexible display 230.

When the tension T by the tension structure is in a threshold range, the bendable section ② may be maintained in a smoothly connected form to the first section ① without lifting in the closed state of FIG. 5 or the open state of FIG. 6. When the tension T by the tension structure is in a threshold range, in a switch between the closed state of FIG. 5 and the open state of FIG. 6, the bendable section ② may be moved while maintaining a smoothly connected form to the first section ① without lifting. When the tension T by the tension structure is in a threshold range, the slide operation may be smoothly implemented in the switch between the closed state in FIG. 5 and the open state in FIG. 6.

For example, the tension T by the tension structure may be lower than a threshold range. In this case, due to elasticity of the flexible display 230 and/or elasticity of the support sheet 470, the bendable section ② may be lifted or may not be smoothly connected to the first section ①.

In another example, the tension T by the tension structure may be greater than a threshold range. In this case, the bendable section ② may be smoothly connected to the first section ① without lifting, but it may be difficult to smoothly perform the slide operation in the switch between the closed state of FIG. 5 and the open state of FIG. 6. When the tension applied to the flexible display 230 and the attached support sheet 470 is greater than the threshold range, a load applied to the rotation shaft of the pulley 460 exceeds a threshold value. Thus, the resistance to a rotation of the pulley 460 increases, making a smooth and soft slide motion more difficult.

It may be difficult to assemble a tension structure and elements (e.g., electric mechanical elements) related thereto within the electronic device 200 while keeping the tension T acting on the flexible display 230 and/or the support sheet 470 in a threshold range. The tension T acting on the flexible display 230 and/or the support sheet 470 may be smaller than a threshold range due to repetition of the slide operation. The electronic device 200 may detect a lifting phenomenon of the bendable section ② of the flexible display 230. The electronic device 200 capable of detecting a lifting phenomenon of the bendable section ② of the flexible display 230 will be described later with reference to FIG. 7.

Figure 7:
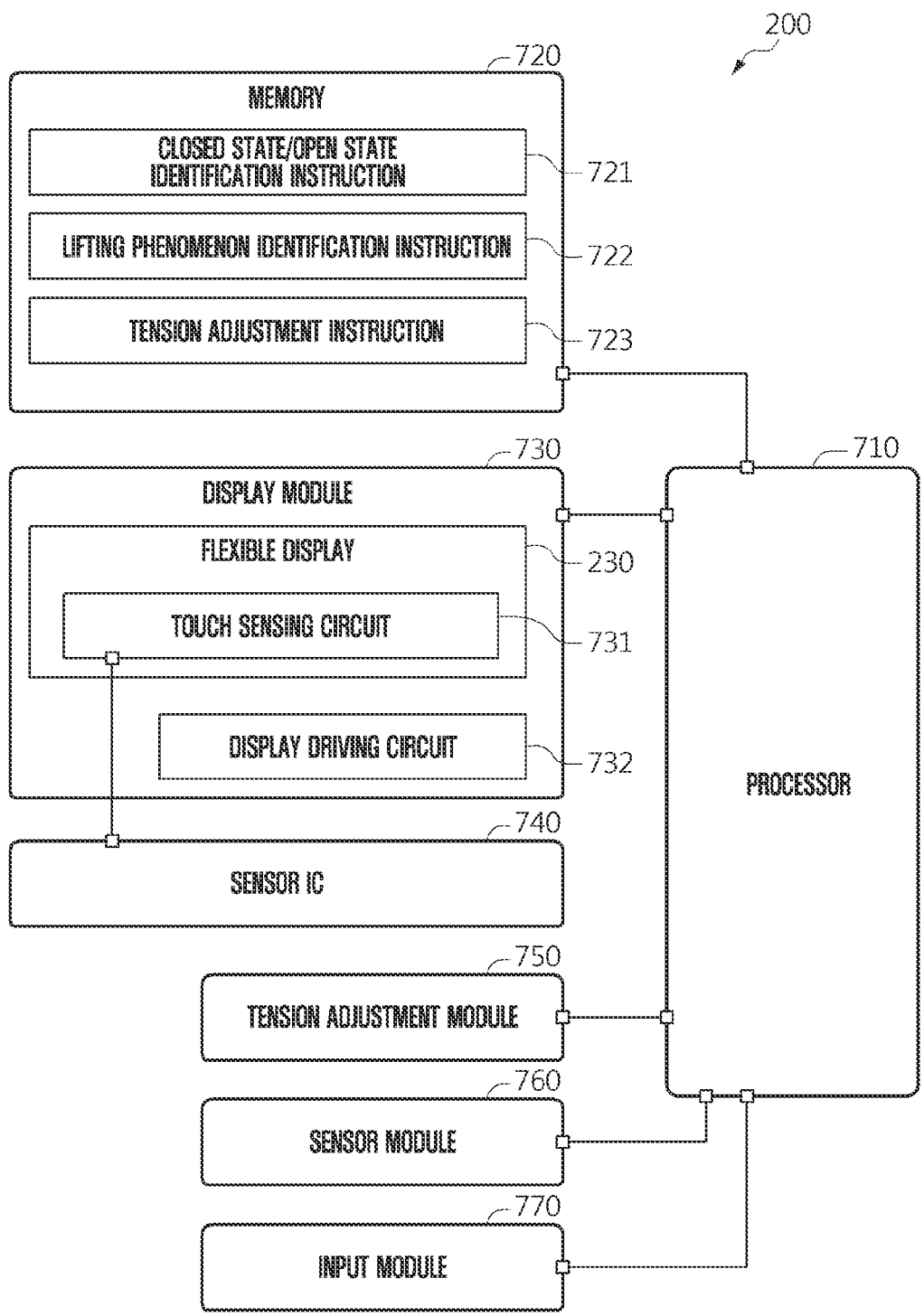
FIG. 7 is a block diagram illustrating the electronic device of FIG. 2A, according to an embodiment.

FIG. 7 is a block diagram illustrating the electronic device 200 of FIG. 2A, according to an embodiment.

With reference to FIG. 7, the electronic device 200 includes a processor 710, a memory 720, a display module 730, a sensor IC 740, a tension adjustment module 750, a sensor module 760, or an input module 770. The electronic device 200 may be the electronic device 101 of FIG. 1 or may be implemented by including at least some of the components of the electronic device 101 of FIG. 1 or additionally including other components. The electronic device 200 may be implemented by omitting some of the components of the electronic device 101 of FIG. 1.

The processor 710 (e.g., the processor 120 of FIG. 1) may include, for example, a micro controller unit (MCU), and operate an operating system (OS) or embedded software program to control a number of hardware components connected to the processor 710. The processor 710 may control, for example, a number of hardware components according to instructions (e.g., the program 140 of FIG. 1) stored in the memory 720 (e.g., the memory 130 of FIG. 1).

The display module 730 (e.g., the display module 160 of FIG. 1) may include, for example, a flexible display 230 and/or a display driving circuit 732.

A part (e.g., the bendable section ② of FIG. 4) of the flexible display 230 may be drawn out from the internal space of the electronic device 200. For example, when the electronic device 200 is switched from a closed state (see FIG. 2A or FIG. 5) to an open state (see FIG. 3A or FIG. 6), the bendable section ② of the flexible display 230 may be drawn out from the internal space of the electronic device 200 by sliding. Thus, the screen may be expanded. When the electronic device 200 is switched from the open state to the closed state, the bendable section ② may be retracted into the internal space of the electronic device 200 by sliding. Thus, the screen may be reduced.

The display driving circuit 732 is a circuit for controlling the flexible display 230 and may include, for example, a display drive integrated circuit (DDI) or a DDI chip. The display driving circuit 732 may include a touch display driver IC (TDDI) disposed in a chip on panel (COP) or chip on film (COF) manner. The processor 710 (e.g., an AP) may be disposed in the PCB 490 of FIG. 4, 5, or 6, and a signal commanded by the processor 710 may be transferred to the display driving circuit 732. The display driving circuit 732 may serve as a signal path between the flexible display 230 and the processor 710 to control pixels through thin film transistors (TFTs) in the flexible display 230. For example, the display driving circuit 732 may have a function of turning on or off pixels included in the flexible display 230 and be electrically connected to a gate electrode of the TFT. The display driving circuit 732 may have a function of making a color difference by adjusting an amount of red, green, and blue (RGB) signals of pixels, and be electrically connected to a source electrode of the TFT. The TFT may include a gate line electrically connecting the display driving circuit 732 and the gate electrode of the TFT, and a source line (or data line) electrically connecting the display driving circuit 732 and the source electrode of the TFT. The display driving circuit 732 may operate corresponding to a red, green, blue, and white (RGBW) scheme in which a white pixel is added to an RGB pixel.

The display driving circuit 732 may be a DDI package. The DDI package may include a DDI (or DDI chip), a timing controller (T-CON), a graphic RAM (GRAM), or power generating circuits. The graphic RAM may be omitted or a memory provided separately from the display driving circuit 732 may be used. The timing controller may convert a data signal input from the processor 710 into a signal required by the DDI. The timing controller may serve to adjust input data information into signals appropriate for a gate driver (or gate IC) and a source driver (or source IC) of the DDI. The graphic RAM may serve as a memory that temporarily stores data to be input to the driver (or IC) of the DDI. The graphic RAM may store the input signal and send the input signal hack to the DDI driver, and in this case, the graphic RAM may interact with the timing controller to process the signal. The power driver may generate a voltage for driving the flexible display 230 to supply necessary voltages to the gate driver and the source driver of the DDI.

The flexible display 230 may include a touch sensing circuit (or touch sensor) 731. The touch sensing circuit 731 may include, for example, a transmitter Tx including a plurality of first electrode lines (or a plurality of driving electrodes), and a receiver Rx including a plurality of second electrode lines (or a plurality of receiving electrodes). The sensor IC 740 may supply a current (e.g., alternating current) to the touch sensing circuit 731, and an electric field may be formed between the transmitter and the receiver of the touch sensing circuit 731. The sensor IC 740 may convert an analog signal Obtained through the touch sensing circuit 731 into a digital signal. For example, when a finger touches a screen (see the screen 2301 of FIG. 2A or FIG. 3A) or reaches within a threshold distance from the screen, a change in the electric field may occur and a change in capacitance (or voltage drop) associated therewith may occur. When the change in capacitance is greater than or equal to a threshold value, the sensor IC 740 may generate an electrical signal related to coordinates on the screen as a valid touch input or hovering input and output the electrical signal to the processor 710. The processor 710 may recognize coordinates on the screen based on the electrical signal received from the sensor IC 740. The sensor IC 740 may be disposed in the PCB 490 of FIG. 4.

The sensor IC 740 may include a touch controller IC. The touch controller IC may perform various functions such as noise filtering, noise removal, and sensing data extraction in relation to the touch sensing circuit 731. The touch controller IC may include various circuits such as an analog-digital converter (ADC), a digital signal processor (DSP), and/or an MCU.

The tension adjustment module 750 may be, for example, included in or connected to a tension structure that provides tension acting on the flexible display 230. The tension adjustment module 750 may adjust tension acting on the flexible display 230 according to a control signal from the processor 710.

The sensor module 760 (e.g., the sensor module 176 of FIG. 1) may measure, for example, a physical quantity or detect an operation state of the electronic device 200 to generate an electrical signal or data value corresponding thereto. The sensor module 760 may include, for example, a gesture sensor, a gyro sensor, an atmospheric sensor, a magnetic sensor, an acceleration sensor, a grip sensor, a proximity sensor, a color sensor, an IR sensor, a biometric sensor, a temperature sensor, a humidity sensor, or an illuminance sensor. The sensor module 760 may further include at least one control circuit for controlling at least one sensor included therein.

The input module 770 (e.g., the input module 150 of FIG. 1) may receive, for example, a user input. The input module 770 may include, for example, a key input device. The key input device may include, for example, a key of various types, such as a physical key, a capacitive key, or an optical key. The input module 770 may include other various types of user interfaces.

The memory 720 (e.g., the memory 130 of FIG. 1) may store a closed state/open state identification instruction 721, a lifting phenomenon identification instruction 722, or a tension adjustment instruction 723.

The closed state/open state identification instruction 721 may include instructions that when executed cause the processor 710 to identify a closed state (see FIG. 2A or FIG. 5), an open state (see FIG. 3A or FIG. 6) of the electronic device 200, or a switch between the closed state and the open state using at least one sensor included in the sensor module 760.

For example, the processor 710 may identify a closed state, an open state, or a switch between the closed state and the open state of the electronic device 200 using a magnetic sensor (e.g., a hall IC) of the sensor module 760. The magnetic sensor may be disposed in the support member assembly 400 (e.g., the first support member 410) of FIG. 4. A magnetic material (e.g., a magnet) may be disposed in the sliding plate 220 of FIG. 4. When the electronic device 200 is in an open state, the magnetic sensor moves away from the magnetic material compared to when the electronic device 200 is in the closed state, and thus, it may be difficult for the magnetic sensor to detect the magnetic material. When the electronic device 200 is in a closed state, the magnetic sensor may be positioned adjacent to or to face the magnetic material to detect the magnetic material. The magnetic sensor may provide an electrical signal generated by detecting a magnetic material to the processor 710, and the processor 710 may identify a closed state of the electronic device 200 based on the electrical signal from the magnetic sensor. The magnetic sensor may be continuously driven or periodically driven using constant power. When an electrical signal is continuously or periodically detected from the magnetic sensor, the processor 710 may identify a closed state of the electronic device 200. The processor 710 may identify that the electronic device 700 is switched from an open state to a closed state or from a closed state to an open state using the magnetic sensor. When the electronic device 700 is in an open state, the magnetic sensor may be positioned adjacent to or to face the magnetic material to detect the magnetic material. The magnetic sensor may be positioned in the sliding plate 220 of FIG. 4, and the magnetic material may be positioned in the support member assembly 400 of FIG. 4.

A first magnetic sensor and a second magnetic sensor may be disposed at different positions of the support member assembly 400 (e.g., the first support member 410) of FIG. 4. The magnetic material may be disposed in the sliding plate 220 of FIG. 4. When the electronic device 200 is in a closed state, the first magnetic sensor may be positioned adjacent to or to face the magnetic material to detect the magnetic material. When the electronic device 200 is in an open state, the second magnetic sensor may be positioned adjacent to or to face the magnetic material to detect the magnetic material. When an electrical signal is detected from the first magnetic sensor, the processor 710 may identify a closed state of the electronic device 200. When an electrical signal is detected from the second magnetic sensor, the processor 710 may identify an open state of the electronic device 200.

Various other sensors may be utilized to identify a closed state, an open state, or a switch between the closed state and the open state of the electronic device 200. For example, referring to FIG. 4, a sensor capable of detecting a position and/or a movement of the sliding plate 220, the flexible display 230, or the support sheet 470 may be utilized. In another example, referring to FIG. 4, a sensor for detecting a rotation of the pulley 460 may be utilized.

A first contact may be disposed in the support member assembly 400 (e.g., the first support member 410) of FIG. 4, and a second contact may be disposed in the sliding plate 220 of FIG. 4. When the electronic device 200 is in a closed state or an open state, the first contact and the second contact may be in physical contact to conduct electricity. The processor 710 may identify a closed state, an open state, or a switch between the closed state and the open state of the electronic device 200 based on electric conduction between the first contact and the second contact.

The lifting phenomenon identification instruction 722 may include instructions that when executed cause the processor 710 to identify whether there is a lifting phenomenon in the bendable section ② (see FIG. 4, 5, or 6) of the flexible display 230 using the touch sensing circuit 731 and the sensor IC 740. The detections of a lifting phenomenon in the bendable section ② of the flexible display 230 by the processor 710, based on the lifting phenomenon identification instruction 722 is described in greater detail below with reference to FIGS. 8, 9, 10, and 11.

Figure 8:
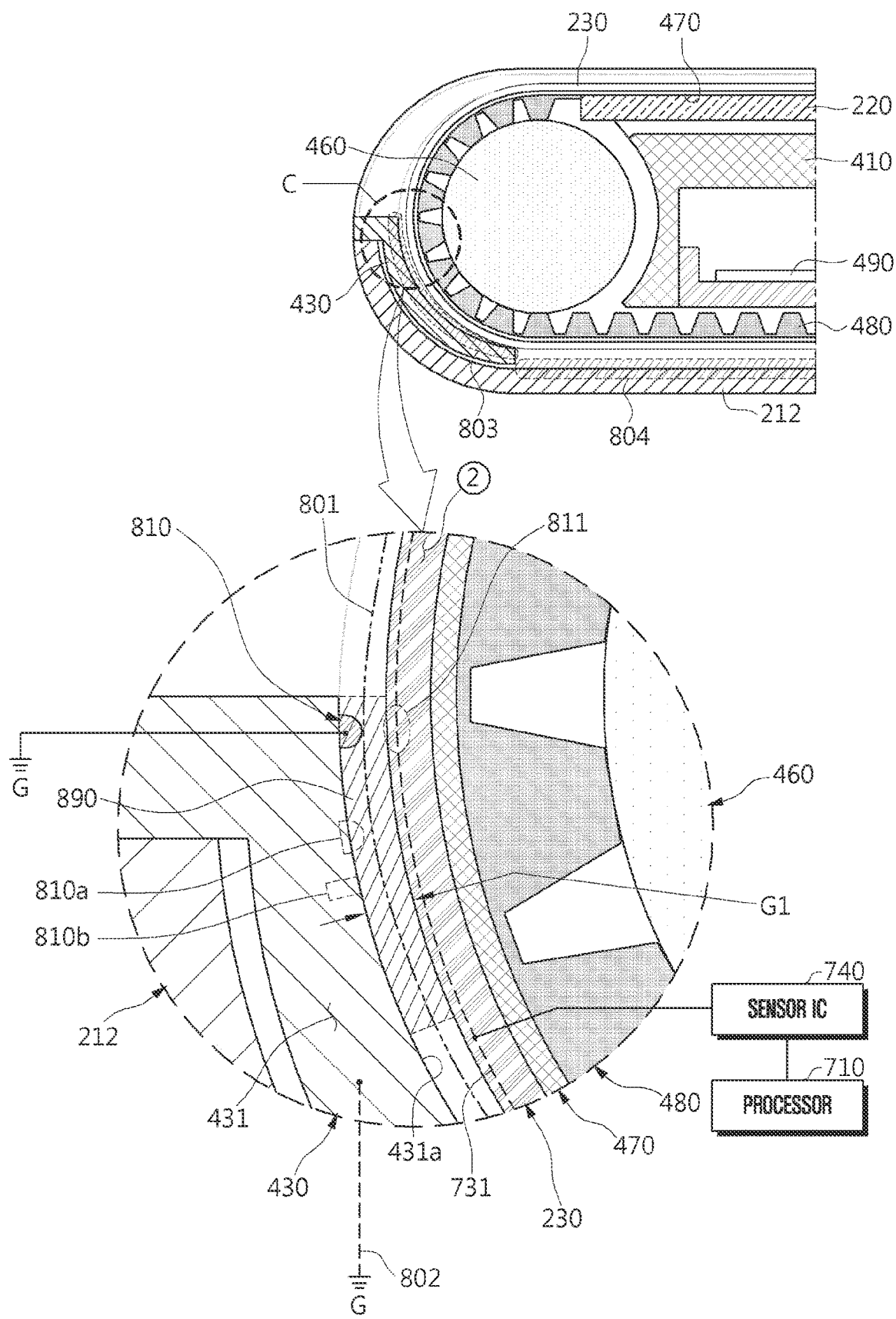
FIG. 8 is a diagram illustrating an enlarged view of a portion indicated by reference numeral 'C' in the cross-sectional view of the closed state of FIG. 5, according to an embodiment.
Figure 9:
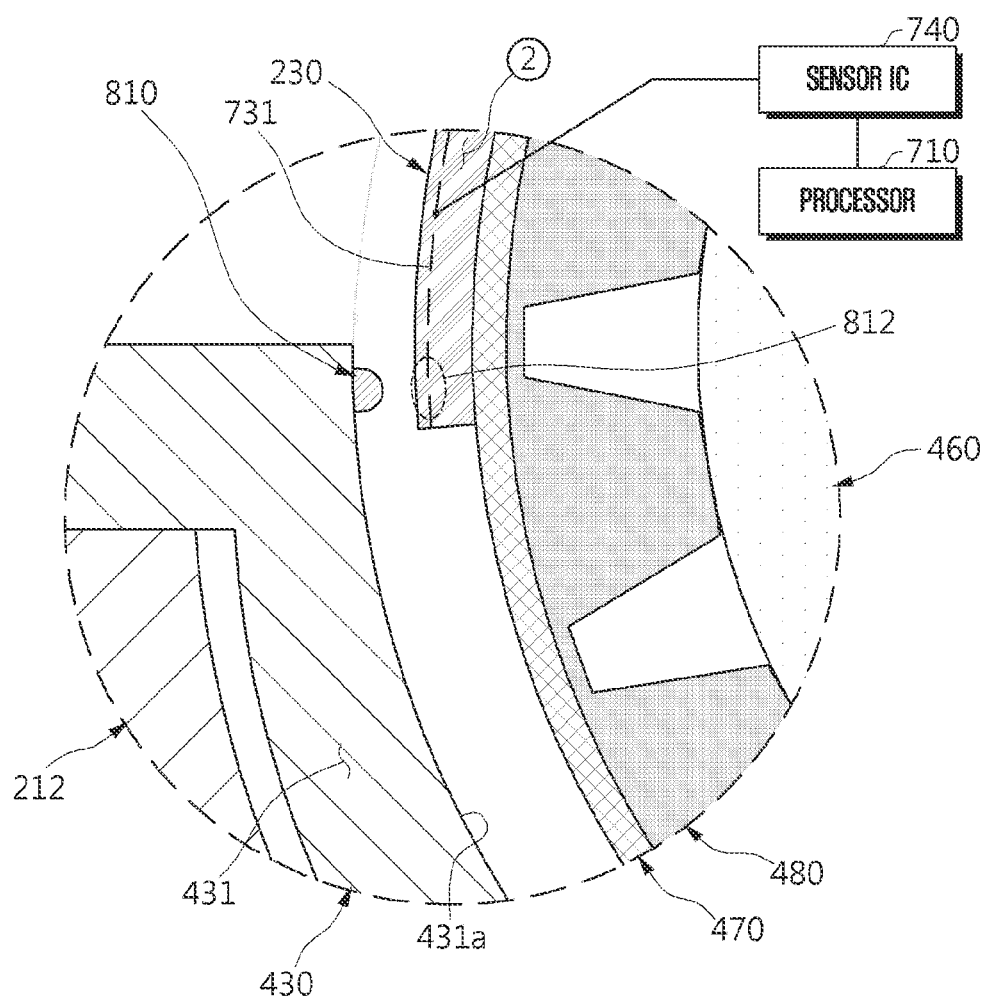
FIG. 9 is a diagram illustrating an enlarged view of a portion indicated by reference numeral 'D' in the cross-sectional view of the open state of FIG. 6, according to an embodiment.

FIG. 8 is a diagram illustrating an enlarged view of portion indicated by reference numeral 'C' in the cross-sectional view of the closed state of FIG. 5, according to an embodiment. FIG. 9 is a diagram illustrating an enlarged view of a portion indicated by reference numeral 'D' in the cross-sectional view of the open state of FIG. 6, according to an embodiment.

A description of elements already described in detail above will be omitted for readability and conciseness.

Referring to FIGS. 8 and 9, a first dielectric 810 is disposed in the third support member 430 between the bendable section ② of the flexible display 230 and the third support member 430. The first dielectric 810 may face the bendable section ② of the flexible display 230. The portion 431 of the third support member 430 may have a curved shape corresponding to the pulley 460, and include a curved surface 431a corresponding to the roller 461 (see FIG. 4) of the pulley 460. The first dielectric 810 may be disposed in the curved surface 431a of the third support member 430. For example, the first dielectric 810 may be attached to the curved surface 431a of the third support member 430 using an adhesive material, and be protruded from the curved surface 431a. The first dielectric 810 may be disposed in the third support member 430 in a structure in which at least a portion thereof is inserted into a groove (or recess) formed in the third support member 430, as indicated by reference numeral 810a or 810b. For example, referring to reference numeral 810a, a portion of the first dielectric 810 may be inserted into a groove formed in the third support member 430, and the remaining portions of the first dielectric 810 may be protruded from the curved surface 431a. In another example, referring to reference numeral 810b, the first dielectric 810 may be inserted into a groove formed in the third support member 430 and be not protruded from the curved surface 431a. The first dielectric 810 may include a convex shape and face the flexible display 230. A shape, number, or position of the first dielectric 810 may vary and is not limited to that shown in FIG. 8.

The first dielectric 810 may be positioned inside the electronic device 200 while facing a curved portion of the flexible display 230 corresponding to the pulley 460. For example, the first dielectric 810 may be positioned in at least a portion of the area of the third support member 430 indicated by reference numeral '803'.

The first dielectric 810 may be positioned inside the electronic device 200 while facing the flexible display 230 between a portion in which the flexible display 230 is bent corresponding to the pulley 460 and a portion in which the tension T by the tension structure is applied to the flexible display 230. For example, the first dielectric 810 may be positioned in at least a portion of an area (e.g., an area of the back cover 212 extended in the x-axis direction) of the back cover 212 indicated by reference numeral 804. The third support member 430 may be extended to have an area extended in the x-axis direction while overlapping the back cover 212, and the first dielectric 810 may be positioned in the extended area.

The first dielectric 810 may include a flexible material. When the bendable section ② of the flexible display 230 comes into contact with the first dielectric 810 due to the lifting phenomenon, elasticity of the first dielectric 810 may reduce a stress effect on the flexible display 230. A convex shape of the first dielectric 810 facing the flexible display 230 may also reduce a stress effect exerted on the flexible display 230 when the bendable section ② comes into contact with the first dielectric 810.

The first dielectric 810 may be electrically connected to a ground G, and include various metal materials or polymer materials. The first dielectric 810 may include, for example, a polymeric material or a metallic material including copper or having electrical conductivity less than or greater than electrical conductivity (about $5.96 \times 10^7$ S/m) of copper. The ground G may include, for example, a ground plane included in the PCB 490 of FIG. 4. The first dielectric 810 may be electrically connected to the ground G through various electrical paths such as a cable or an FPCB. The electrical path may be at least partially disposed in a surface of the third support member 430 or may be at least partially disposed inside the third support member 430. At least a portion of the electrical path may be implemented into a conductive pattern included in the third support member 430 or disposed in the third support member 430. For example, the conductive pattern may be implemented by laser direct structuring (LDS). The conductive pattern (e.g., LDS pattern) may be formed by designing a pattern in a non-conductive portion including at least a portion of the third support member 430 using laser and plating a conductive material such as copper or nickel thereon. The conductive pattern may be disposed in the third support member 430 through printing.

The third support member 430 may include a non-metal material.

The third support member 430 may include a metal material (e.g., aluminum, stainless steel (STS), or magnesium). The first dielectric 810 may include a metal material. The first dielectric 810 and the third support member 430 may be electrically connected. For example, a conductive adhesive material may be disposed between the first dielectric 810 and the third support member 430. The first dielectric 810 and the third support member 430 may be integrally formed and include the same metal material. When the first dielectric 810 and the third support member 430 are electrically connected to each other, the third support member 430 may be electrically connected to the ground G (see reference numeral 802). A non-conductive adhesive material may be disposed between the first dielectric 810 and the third support member 430, and in this case, an electrical path for electrically connecting the first dielectric 810 and the ground G may be provided.

There may be a gap G1 between the curved surface 431a of the third support member 430 and the bendable section ② of the flexible display 230. When a lifting phenomenon of the bendable section ② occurs, the gap G1 may provide an available space that enables the bendable section ② to move closer to the curved surface 431a of the third support member 430. When a lifting phenomenon of the bendable section ② occurs (see a virtual line indicated by reference numeral 801), a distance between the first dielectric 810 and the bendable section ② may be reduced or the bendable section ② may be in contact with the first dielectric 810.

The touch sensing circuit 731 included in the flexible display 230 may be implemented in a capacitive manner. The touch sensing circuit 731 may be implemented into a transparent conductive layer (or film) based on various conductive materials such as indium tin oxide (ITO). For example, the touch sensing circuit 731 may be interposed between an optical layer (e.g., a layer for improving an image quality or outdoor visibility of a screen, such as a polarizing layer) and a light emitting layer (e.g., a layer including a plurality of pixels implemented with a light emitting element such as OLED and at least one TFT controlling the same) (e.g., display panel) of the flexible display 230 (e.g., on-cell type). In another example, the electronic device 200 may include a transparent cover that serves to protect the flexible display 230 from the outside, and the touch sensing circuit may be interposed between the transparent cover and the optical layer (e.g., polarization layer) (e.g., add-on type). In another example, the light emitting layer may include a touch sensing circuit 731 or a touch sensing function (e.g., in-cell type). The flexible display 230 may be implemented based on an OLED, and include an encapsulation layer (e.g., a thin-film encapsulation (TFE)) disposed between the light emitting layer and the optical layer. Electrodes and organic materials that emit light in OLEDs may react very sensitively to oxygen and/or moisture to lose luminescent properties thereof. The encapsulation layer may seal the light emitting layer so that oxygen and/or moisture do not penetrate into the OLED. The flexible display 230 is a touch sensing circuit 731 disposed in the encapsulation layer between the encapsulation layer and the optical layer, and may include a conductive pattern such as a metal mesh (e.g., aluminum metal mesh). For example, the metal mesh may have greater durability than that of a transparent conductive layer implemented with no corresponding to bending of the flexible display 230.

In a mode (hereinafter referred to as a "lifting phenomenon detection mode") for detecting a lifting phenomenon of the bendable section ② of the flexible display 230, the sensor IC 740 may activate a designated touch area including a first touch area (or first touch position) facing the first dielectric 810 in the touch sensing circuit 731 under the control of the processor 710. The lifting phenomenon detection mode may be performed in the closed state of FIG. 5 or the open state of FIG. 6. In this case, a first touch area 811 facing the first dielectric 810 in the closed state of FIG. 5 and the first touch area 812 facing the first dielectric 810 in the open state of FIG. 6 may be included in different areas, respectively of the bendable section ②. The lifting phenomenon detection mode may be performed in a switch between the closed state of FIG. 5 and the open state of FIG. 6, and in this case, a plurality of first touch areas during the switch may face sequentially with the first dielectric 810. In the lifting phenomenon detection mode, the sensor IC 740 may apply a voltage to a designated touch area including the first touch area facing the first dielectric 810 under the control of the processor 710, and the designated touch area may form an electric field. The designated touch area may include only the first touch area substantially facing the first dielectric 810. The designated touch area may include a plurality of first touch areas that can sequentially face the first dielectric 810 in a switch between the closed state of FIG. 5 and the open state of FIG. 6. The designated touch area may be a first touch area substantially facing the first dielectric 810 or a touch area locally including a plurality of first touch areas. The sensor IC 740 may detect capacitance of the first touch area facing the first dielectric 810 in the lifting phenomenon detection mode, and the processor 710 may identify whether there is a lifting phenomenon in the bendable section ② based on the capacitance of the first touch area.

When the lifting phenomenon of the bendable section ② does not occur, the first dielectric 810 and the first touch area facing thereto may be spaced apart from each other by a threshold distance range. When there is a lifting phenomenon in the bendable section ② (see a virtual line indicated by reference numeral '801'), the first dielectric 810 and the first touch area facing thereto may be spaced apart from each other by a distance smaller than the threshold distance range or may be in contact with each other. When a distance between the first dielectric 810 and the bendable section ② is reduced due to the lifting phenomenon of the bendable section ② or the bendable section ② comes into contact with the first dielectric 810, an electric field of the first touch area facing the first dielectric 810 may be changed. The lifting phenomenon of the bendable section ② may be detected based on a change in an electric field of the first touch area facing the first dielectric 810. A change in the electric field may relate to a change in permittivity, or a change in capacitance (or electric capacity). For example, when the distance between the first dielectric 810 and the bendable section ② is reduced due to the lifting phenomenon of the bendable section ② or the bendable section ② is in contact with the first dielectric 810, the permittivity may change, which may result in a change in capacitance (or electric capacity). When the distance between the first dielectric 810 and the bendable section ② is reduced due to the lifting phenomenon of the bendable section ② or the bendable section ② comes into contact with the first dielectric 810, at least some of electrons that were induced from the driving electrode (or transmitter) to the receiving electrode (or receiver) in the first touch area move to the ground G through the first dielectric 810. Thus, a capacitance change or a voltage drop may occur in the first touch area. The lifting phenomenon of the bendable section ② may be detected based on a change in capacitance or a voltage drop in the first touch area facing the first dielectric 810. The sensor IC 740 may include a touch controller IC, where the touch controller IC may detect a change in capacitance or a voltage drop of the first touch area facing the first dielectric 810 in the lifting phenomenon detection mode. The sensor IC 740 may be a sensor provided separately from the touch controller IC.

Referring now to FIG. 9, the touch sensing circuit 731 is disposed to at least partially overlap the curved surface 431a of the third support member 430 in an unfolded state of the electronic device 200. The light emitting layer (e.g., display panel) of the flexible display 230 including a plurality of pixels may be disposed to not face the curved surface 431a of the third support member 430 in an unfolded state of the electronic device 200. The light emitting layer may include an extension portion that partially faces the curved surface 431a of the third support member 430 in the unfolded state of the electronic device 200. In this case, the extension portion is a non-screen portion that is not exposed to the outside and may be maintained in substantially an inactive state.

The touch sensing circuit 731 may be disposed to not face the first dielectric 810 in the unfolded state of the electronic device 200. In this case, the lifting phenomenon detection mode may be implemented in a switch between the closed state of FIG. 6 or the closed state of FIG. 5 and the open state of FIG. 6.

Even if the first dielectric 810 is not electrically connected to the ground G, when there is a lifting phenomenon of the bendable section ②, the first dielectric 810 may include a material that can change an electric field of a first touch area facing the first dielectric 810.

The flexible display 230 may include a pressure sensor capable of measuring the intensity (pressure) of the touch. The processor 710 may detect a lifting phenomenon of the bendable section ② based on the electrical signal obtained from the pressure sensor. Due to the lifting phenomenon of the bendable section ②, the first dielectric 810 may press the bendable section ②, and the pressure sensor may provide an electrical signal related thereto to the processor 710.

Figure 10:
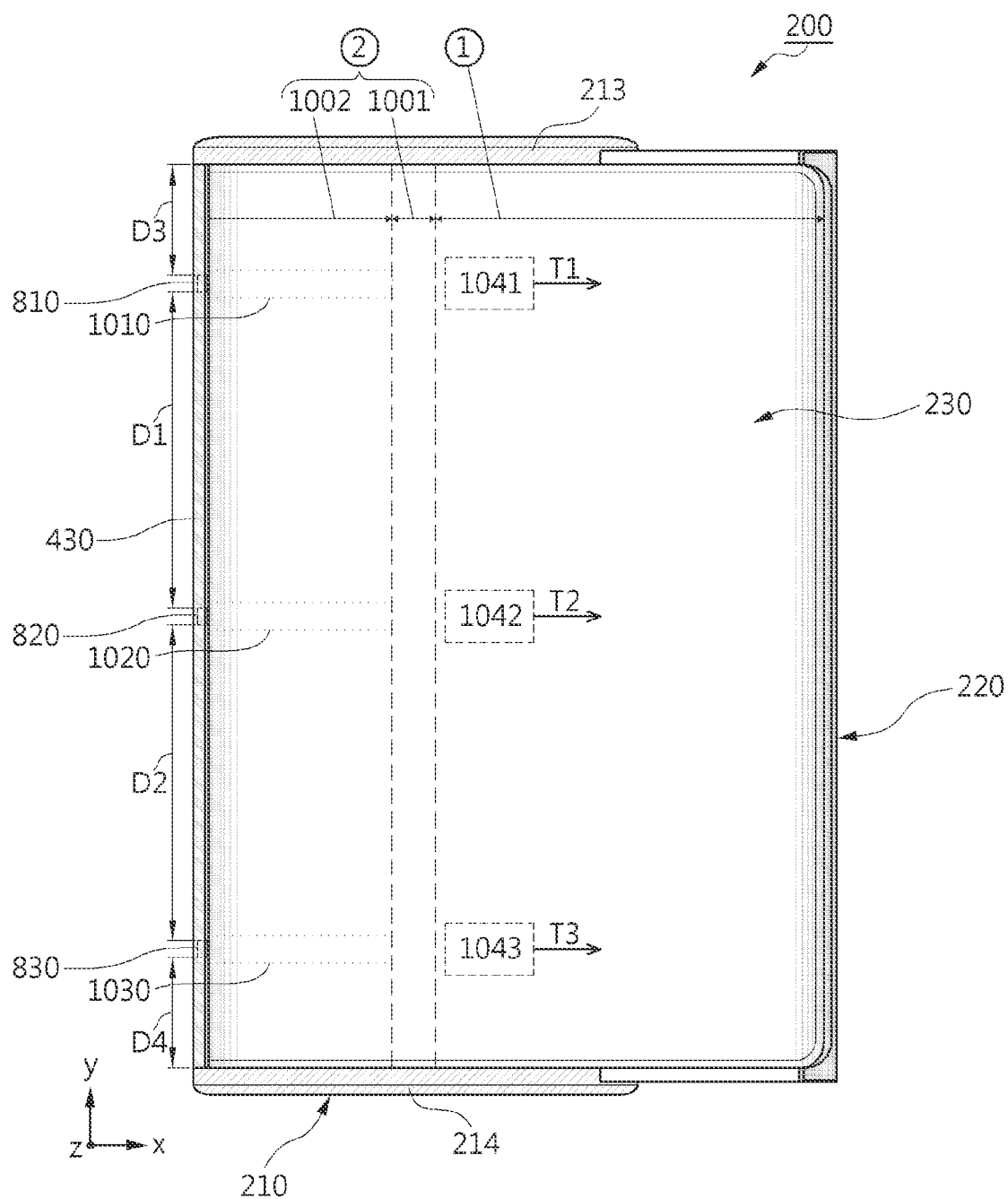
FIG. 10 is a diagram illustrating a plan view of an electronic device in an open state, according to an embodiment.

FIG. 10 is a diagram illustrating a plan view of the electronic device 200 in an open state, according to an embodiment.

Referring to FIG. 10, the electronic device 200 includes the housing 210, the sliding plate 220, the flexible display 230, the first dielectric 810, a second dielectric 820, and a third dielectric 830. The flexible display 230 includes the first section ① and the bendable section ② extended from the first section ① and extracted from an inner space of the housing 210 when the sliding plate 220 slides out. Descriptions of elements already described in detail above are omitted in the description below for readability and conciseness.

The bendable section ② of the flexible display 230 includes a first area 1001 and a second area 1002. The first area 1001 is positioned between the second area 1002 and the first section ①, forms the second curved portion 230c of the screen 2301 in the closed state of FIG. 5, and forms a portion of the flat portion 230a included in the screen 2301 in the open state of FIG. 6.

In a switch between the closed state of FIG. 5 and the open state of FIG. 8, a first portion 1010 including a plurality of first touch areas sequentially facing the first dielectric 810 may be positioned in the second area 1002 of the bendable section ②. The electronic device 200 may further include the second dielectric 820 or the third dielectric 830, where the second dielectric 820 or the third dielectric 830 may be implemented substantially the same as the first dielectric 810. In a switch between the closed state of FIG. 5 and the open state of FIG. 8, a second portion 1020 including a plurality of second touch areas sequentially facing the second dielectric 820 may be positioned in the second area 1002 of the bendable section ②. In a switch between the closed state of FIG. 5 and the open state of FIG. 8, a third portion 1030 including a plurality of third touch areas sequentially facing the third dielectric 830 may be positioned in the second area 1002 of the bendable section ②.

The lifting phenomenon identification instruction 722 of FIG. 7 may include instructions that when executed cause the processor 710 to activate a designated touch area including a first touch area facing the first dielectric 810, a second touch area facing the second dielectric 820, and a third touch area facing the third dielectric 830 in the lifting phenomenon detection mode.

For example, the designated touch area may include only a first touch area substantially facing the first dielectric 810, a second touch area substantially facing the second dielectric 820, and a third touch area substantially facing a third dielectric 830.

In another example, the designated touch area may be a touch area locally including a first touch area substantially facing the first dielectric 810, a second touch area substantially facing the second dielectric 820, and a third touch area substantially facing a third dielectric 830. The designated touch area may be all touch areas included in the bendable section ②. The designated touch area may be all touch areas included in the second area 1002 of the bendable section ②. The designated touch area may include the first portion 1010, the second portion 1020, and the third portion 1030. The designated touch area may be extended in a straight line form in the y-axis direction, and be a touch area locally including a first touch area substantially facing the first dielectric 810, a second touch area substantially facing the second dielectric 820, and a third touch area substantially facing the third dielectric 830.

In the lifting phenomenon detection node, a touch input or a hovering input based on a change in capacitance may occur in a touch area other than a first touch area substantially facing the first dielectric 810, a second touch area substantially facing the second dielectric 820, or the third touch area substantially facing the third dielectric 830. For example, a portion of the designated touch area activated in the lifting phenomenon detection mode may be included in the screen, and the processor 710 may process (e.g., nonresponsive) a touch input or a hovering input detected through the portion as an invalid input according to the lifting phenomenon identification instruction 722 of FIG. 7.

The lifting phenomenon identification instruction 722 of FIG. 7 may include instructions that when executed cause the processor 710 to enter a lifting phenomenon detection mode when a switch between the closed state and the open state of the electronic device 200 is identified through the closed state/open state identification instruction 721. The lifting phenomenon identification instruction 722 may include instructions that when executed cause the processor 710 to enter the lifting phenomenon detection mode when a designated user input is detected through the input module 770.

The second dielectric 820 may be interposed between the first dielectric 810 and the third dielectric 830. A first distance D1 in the y-axis direction between the first dielectric 810 and the second dielectric 820 may be substantially the same as a second distance D2 in the y-axis direction between the second dielectric 820 and the third dielectric 830. A third distance D3 at which the first dielectric 810 is spaced apart from the first side cover 213 in the −y-axis direction may be substantially the same as a fourth distance D4 at which the third dielectric 830 is spaced apart from the second side cover 214 in the y-axis direction.

The electronic device 200 may include a first tension structure 1041 positioned inside the electronic device 200 corresponding to the first dielectric 810. The electronic device 200 may include a second tension structure 1042 positioned inside the electronic device 200 corresponding to the second dielectric 820. The electronic device 200 may include a third tension structure 1043 positioned inside the electronic device 200 corresponding to the third dielectric 830. The first tension structure 1041 may provide first tension (or first tension force) T1 (e.g., the tension T of FIG. 5 or FIG. 6) at a first position of the bendable section ② of the flexible display 230 in a driving connection state with the pulley 460 (see FIG. 4, 5, or 6). The second tension structure 1042 may provide second tension (or second tension force) T2 at a second position of the bendable section ② of the flexible display 230 in a driving connection state with the pulley 460. The third tension structure 1043 may provide third tension (or third tension force) T3 at a third position of the bendable section ② of the flexible display 230 in a driving connection state with the pulley 460.

When the first tension T1, the second tension T2, and the third tension T3 are in a threshold range, the bendable section may maintain a smoothly connected form with the first section ① without lifting in the closed state of FIG. 2A or the open state of FIG. 3A. For example, the first tension T1, the second tension T2, and the third tension T3 may be substantially the same or have a difference less than or equal to a threshold, and in this case, in the bendable section ②, a substantially even tension distribution that is not biased toward either side may be formed. When the first tension T1, the second tension T2, and the third tension T3 are in a threshold range, in a switch between the closed state of FIG. 2A and the open state of FIG. 3A, the bendable section ② may be moved while maintaining a smoothly connected form with the first section ① without lifting. When the first tension T1, the second tension T2, and the third tension T3 are in a threshold range, the slide operation may be smoothly implemented in a switch between the closed state of FIG. 2A and the open state of FIG. 3A.

For example, the first tension T1 by the first tension structure 1041 may be lower than a threshold range. In this case, the first dielectric 810 and a first touch area of the bendable section ② facing the first dielectric 810 may be spaced apart from each other by a distance smaller than a threshold distance range or may be in contact with each other by a lifting phenomenon due to elasticity of the flexible display 230 and/or elasticity of the support sheet 470 (see FIG. 4, 5, or 6). When the first dielectric 810 and the first touch area facing the first dielectric 810 are spaced apart by a distance less than a threshold distance range or in contact with each other, the sensor IC 740 may provide an electrical signal related to the lifting phenomenon to the processor 710 based on a change in capacitance (or voltage drop) of the first touch area facing the first dielectric 810. The processor 710 may identify a lifting phenomenon of a portion in which the first tension structure 1041 is involved in the bendable section ② based on the electrical signal from the sensor IC 740.

For example, the second tension T2 by the second tension structure 1042 may be lower than a threshold range. In this case, the second dielectric 820 and a second touch area of the bendable section ② facing the second dielectric 820 may be spaced apart from each other by a distance smaller than a threshold distance range or may be in contact with each other by a lifting phenomenon due to elasticity of the flexible display 230 and/or elasticity of the support sheet 470 (see FIG. 4, 5, or 6). When the second dielectric 820 and the second touch area facing the second dielectric 820 are spaced apart by a distance less than a threshold distance range or are in contact with each other, the sensor IC 740 may provide an electrical signal related to the lifting phenomenon to the processor 710 based on a change (or voltage drop) in capacitance of the second touch area facing the second dielectric 820. The processor 710 may identify a lifting phenomenon of a portion in which the second tension structure 1042 is involved in the bendable section ② based on the electrical signal from the sensor IC 740.

For example, the third tension T3 by the third tension structure 1043 may be lower than a threshold range. In this case, the third dielectric 830 and a third touch area of the bendable section ② facing the third dielectric 830 may be spaced apart from each other by a distance smaller than a threshold distance range, or may be in contact with each other by a lifting phenomenon due to elasticity of the flexible display 230 and/or elasticity of the support sheet 470 (see FIG. 4, 5, or 6). When the third dielectric 830 and the third touch area facing the third dielectric 830 are spaced apart by a distance less than a threshold distance range or are in contact with each other, the sensor IC 740 may provide an electrical signal regarding the lifting phenomenon to the processor 710 based on a change (or voltage drop) in capacitance of the third touch area facing the third dielectric 830. The processor 710 may identify a lifting phenomenon of a portion in which the third tension structure 1043 is involved in the bendable section ② based on the electrical signal from the sensor IC 740.

The tension adjustment module 750 of FIG. 7 may include a first tension adjustment module for the first tension structure 1041, a second tension adjustment module for the second tension structure 1042, or a third tension adjustment module for the third tension structure 1043. When a lifting phenomenon of the bendable section ② is identified through the lifting phenomenon identification instruction 722, the tension adjustment instruction 723 of FIG. 7 may include instructions that when executed cause the processor 710 to control the tension adjustment module 750 (e.g., first tension adjustment module, second tension adjustment module, or third tension adjustment module). For example, when a lifting phenomenon of a portion in which the first tension structure 1041 is involved in the bendable section ② is identified, the processor 710 may provide a control signal for tension adjustment to the first tension adjustment module. For example, when a lifting phenomenon of a portion in which the second tension structure 1042 is involved in the bendable section ② is identified, the processor 710 may provide a control signal for tension adjustment to the second tension adjustment module. For example, when a lifting phenomenon of a portion in which the third tension structure 1043 is involved in the bendable section ② is identified, the processor 710 may provide a control signal for tension adjustment to the third tension adjustment module.

The number or position of dielectrics may vary and is not limited that shown in FIG. 10. For example, an even number of dielectrics may be provided. The plurality of dielectrics provided in an even number may be symmetrically disposed based on the center of the first section ① or the center of the screen in the y-axis direction. The plurality of dielectrics provided in an even number may be disposed at a predetermined separation distance in the y-axis direction. A distance between a dielectric of one side closest to the first side cover 213 among the plurality of dielectrics provided in an even number is spaced apart from the first side cover 213 in the +y-axis direction may be substantially the same as a distance in which the other dielectric closest to the second side cover 214 is spaced apart from the second side cover 214 in the −y-axis direction among a plurality of dielectrics provided in an even number. Tension structures corresponding to the plurality of dielectrics provided in an even number and a tension adjustment module related thereto may also be provided in an even number.

Figure 11:
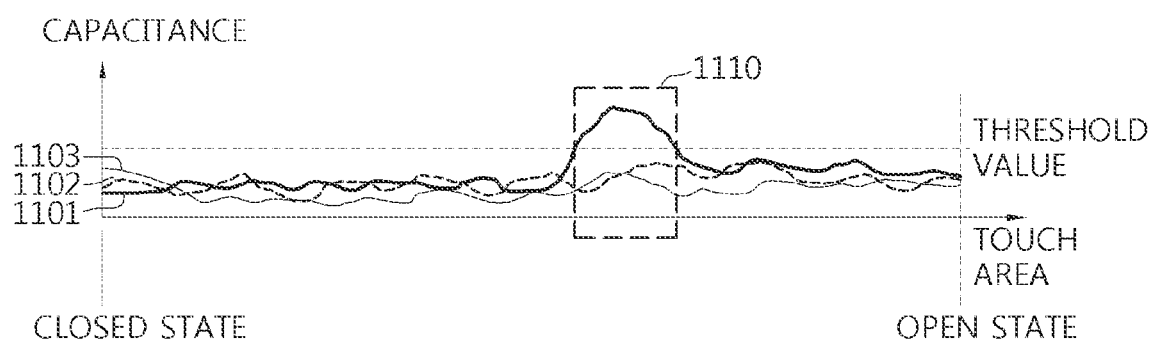
FIG. 11 is a graph illustrating capacitance for each touch area facing each of a first dielectric, a second dielectric, and a third dielectric while the electronic device is switched from a closed state to an open state, according to an embodiment.

FIG. 11 is a graph illustrating capacitance for each touch area facing each of the first dielectric 810, the second dielectric 820, and the third dielectric 830 while the electronic device 200 is switched from a closed state to an open state, according to an embodiment.

Referring to FIGS. 10 and 11, reference numeral 1101 denotes capacitance for a first touch area facing the first dielectric 810. Reference numeral 1102 denotes capacitance for a second touch area facing the second dielectric 820. Reference numeral 1103 denotes capacitance for a third touch area facing the third dielectric 830. For example, referring to a partial section indicated by reference numeral 1110, the capacitance of the first touch area facing the first dielectric 810 may be greater than a threshold value. For example, when the electronic device 200 is switched from a closed state to an open state, some sections indicated by reference numeral 1110 in the bendable section ② of the flexible display 230 may be spaced apart or in contact with the first dielectric 810 by a distance less than a threshold distance range while being lifted. This may indicate that there is a lifting phenomenon in a portion in which the first tension structure 1041 is involved in the bendable section ②. When the electronic device 200 is switched from the closed state to the open state, an external force applied on the screen 2301 (see FIG. 2A or FIG. 3A), a force by the elastic structure 401 (see FIG. 4), first tension T1 by the first tension structure 1041, second tension T2 by the second tension structure 1042, and third tension T3 by the third tension structure 1043 are complexly applied to the flexible display 230 in a driving connection state with the pulley 460 (see FIG. 4), and therefore, a lifting phenomenon may occur in some sections indicated by reference numeral 1101 during a switch from the closed state to the open state. In some cases, a lifting phenomenon may occur in not only some sections indicated by 1101 but also an entire section, or at least some sections of the entire section, and a graph thereof may be different from that of FIG. 11.

When a lifting phenomenon of a portion in which the first tension structure 1041 is involved, a lifting phenomenon of a portion in which the second tension structure 1042 is involved, or a lifting phenomenon of a portion in which the third tension structure 1043 is involved in the bendable section ② is identified, the processor 710 may be set to output a notification related thereto through the screen 2301 or other various output devices (e.g., a speaker). The first tension structure 1041, the second tension structure 1042, or the third tension structure 1043 may be implemented to adjust the tension acting on the flexible display 230 and/or the support sheet 470 (see FIG. 4, 5, or 6). When the notification is identified, an action of manipulating the first tension structure 1041, the second tension structure 1042, or the third tension structure 1043 to adjust the tension acting on the flexible display 230 may be implemented.

The tension adjustment instruction 723 of FIG. 7 may include instructions that when executed cause the processor 710 to select a tension adjustment amount based on a value of a change in capacitance or a value of voltage drop of the first touch area facing the first dielectric 810. The tension adjustment instruction 723 may include instructions that when executed cause the processor 710 to provide a control signal regarding the selected tension adjustment amount to the first tension adjustment module for the first tension structure 1041. Data regarding an amount of tension adjustment based on a value of a change in capacitance or a value of voltage drop may be stored in the memory 720. The selected tension adjustment amount may be a value for first tension T1 acting on the flexible display 230 by the first tension structure 1041 to make a sliding operation to be smooth while reducing a lifting phenomenon of the bendable section ②. In substantially the same manner, the tension adjustment instruction 723 may include instructions that when executed cause the processor 710 to control the second tension adjustment module for the second tension structure 1042, or the third tension adjustment module for the third tension structure 1043.

The first tension structure 1041, the second tension structure 1042, or the third tension structure 1043 of FIG. 10 may include a belt of a wire form or chain form connected to the flexible display 230 or support sheet 470 (see FIG. 4). The tension adjustment module 750 of FIG. 7 may include a motor connected to the belt, and a motor driving circuit (e.g., motor controller or motor driver) electrically connected to the motor. The motor driving circuit may control the motor based on a control signal received from the processor 710, and a rotation direction, rotation angle, rotation amount, rotation speed, rotation acceleration, or rotation angular velocity of the motor may be adjusted. By controlling a motor connected to the belt, tension acting on the flexible display 230 may be adjusted. The motor driving circuit may include a motor encoder for detecting a driving state of the motor. The motor encoder may include, for example, a disk coupled to a rotational shaft of the motor, and a detector that can detect a rotation direction, a rotation angle, a rotation amount, a rotation speed, rotation acceleration, or a rotation angular velocity of the rotation shaft by forming electronically recognizable scales and marks in the disk. The processor 710 may control a first motor driving circuit included in the first tension adjustment module related to the first tension structure 1041, a second motor driving circuit included in the second tension adjustment module related to the second tension structure 1042, or a third motor driving circuit included in the third tension adjustment module related to the third tension structure 1043 based on the tension adjustment instruction 723 of FIG. 7.

The processor 710 may be implemented to have a first control area that stores or implements the closed state/open state identification instruction 721, a second control area that stores or implements a lifting phenomenon identification instruction 722, or a third control area that stores or implements the tension adjustment instruction 723.

Referring back to FIG. 8, a member 890 for preventing inflow of foreign substances (e.g., dust, moisture) may be disposed between the third support member 430 and the bendable section ② of the flexible display 230. The member 890 may have a shape capable of blocking inflow of foreign substances without disturbing a movement of the bendable section ② of the flexible display 230. The member may include, for example, a brush shape, a porous shape, or a mesh shape.

Figure 12:
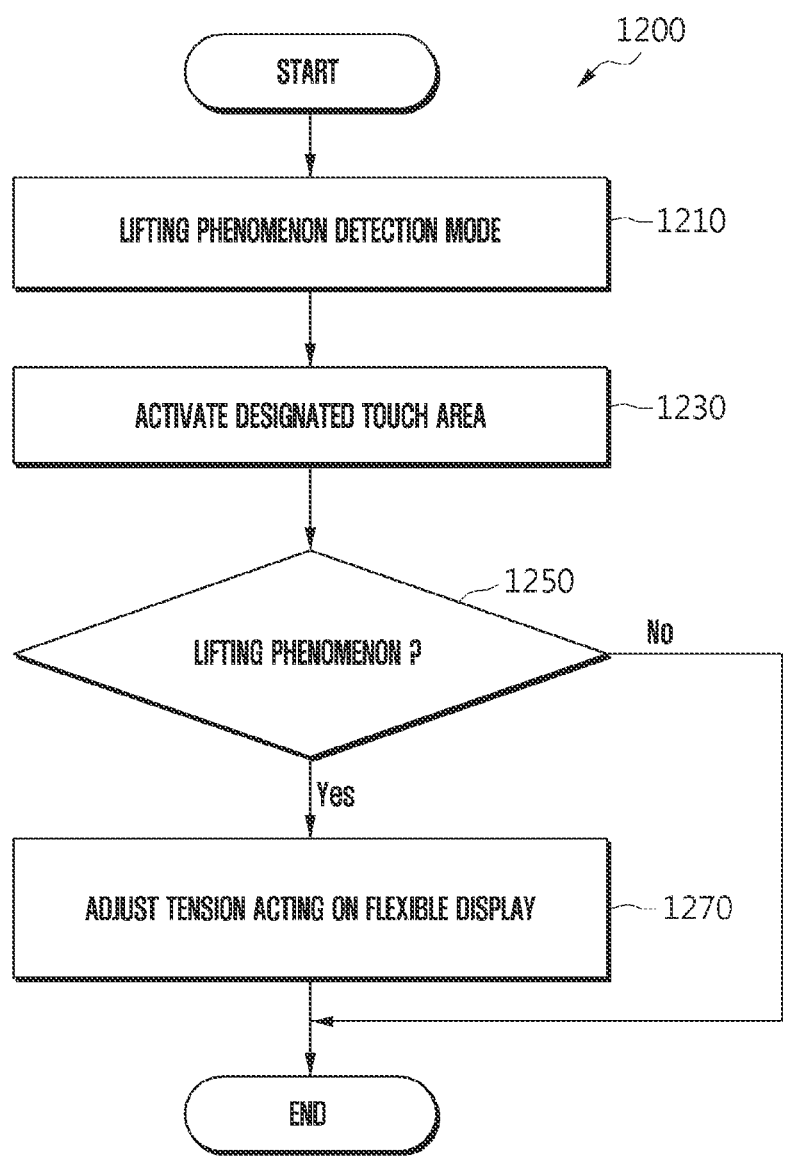
FIG. 12 is a flowchart illustrating an operation of the electronic device of FIG. 7, according to an embodiment.

FIG. 12 is a flow chart illustrating an operational flow of the electronic device 200 of FIG. 7, according to an embodiment.

Referring to an operational flow 1200 of FIG. 12, the processor 710 enters a lifting phenomenon detection mode, at 1210. For example, when a switch between a closed state and an open state of the electronic device 200 is identified, the processor 710 may enter a lift phenomenon detection mode. In another example, when at least one designated user input is detected, the processor 710 may enter a lifting phenomenon detection mode.

At 1230, the processor 710 may activate a designated touch area. For example, referring to FIG. 10, the designated touch area may be a touch area including only a first touch area substantially facing the first dielectric 810, a second touch area substantially facing the second dielectric 820, and a third touch area substantially facing the third dielectric 830 or locally including the first touch area, the second touch area, and the third touch area.

At 1250, the processor 710 may identify whether there is a lifting phenomenon in the bendable section ② of the flexible display 230 using the designated touch area. For example, referring to FIG. 8, due to a lifting phenomenon of the bendable section ② of the flexible display 230, the first dielectric 810 and a first touch area facing the first dielectric 810 may be spaced apart from each other by a distance smaller than a threshold distance range or the first dielectric 810 and may be in contact with each other. Therefore, an electric field of the first touch area facing the first dielectric 810 may change, and a lifting phenomenon of the bendable section ② may be identified based on a change in capacitance or a voltage drop according to the change. In substantially the same manner, a lifting phenomenon of the bendable section ② may be identified based on the change in capacitance or the voltage drop of the second touch area facing the second dielectric 820. In substantially the same manner, a lifting phenomenon of the bendable section ② may be identified based on the change in capacitance or the voltage drop of the second touch area facing the second dielectric 820.

When the lifting phenomenon is not identified, the operational flow 1200 of FIG. 12 terminates.

When the lifting phenomenon is identified, the processor 710 may adjust tension acting on the flexible display 230, at 1270. For example, referring to FIG. 10, the processor 710 may select a tension adjustment amount based on a value of the change in capacitance or a value of the voltage drop in the first touch area facing the first dielectric 810 and provide a control signal of the selected tension adjustment amount to the first tension adjustment module for the first tension structure 1041. In substantially the same manner, the processor 710 may control the second tensioning module for the second tension structure 1042, or the third tensioning module for the third tension structure 1043.

The operational flow 1200 of FIG. 12 may be implemented to identify a lifting phenomenon again by performing step 1250 again after step 1270.

The designated touch area in step 1230 may not be substantially included in the screen. For example, the lifting phenomenon detection mode may be performed in a switch between the closed state of FIG. 2A and the open state of FIG. 3A, and the designated touch area faces a dielectric (e.g., the first dielectric 810, the second dielectric 820, and the third dielectric 830) in the switch, but may not be included in the screen. In this case, the operational flow 1200 of FIG. 12 may further include an operation in which the processor 710 deactivates the designated touch area when the lifting phenomenon is not identified in step 1250 or after step 1270.

At 1230, a portion of the designated touch area may be included in the screen, and another portion of the designated touch area may not be included in the screen while facing the dielectric (e.g., the first dielectric 810, the second dielectric 820, and the third dielectric 830). In this case, when the lifting phenomenon is not identified in step 1250 and/or after step 1270, the operational flow 1200 of FIG. 12 may further include an operation in which the processor 710 deactivates a portion that is not included in the screen in the designated touch areas. When a lifting phenomenon is not identified in step 1250 and/or after step 1270, the operational flow 1200 of FIG. 12 may further include an operation in which the processor 710 activates or deactivates a portion included in the screen in the designated touch areas based on whether the screen is activated. The operational flow 1200 of FIG. 12 may further include an operation in which the processor 710 processes a touch input or a hovering input as an invalid input when a touch input or a hovering input is detected through a portion included in the screen in the designated touch areas in the lifting phenomenon detection mode.

When a lifting phenomenon is identified or not identified at 1250, the operational flow 1200 of FIG. 12 may further include an operation of outputting a notification related thereto through a screen or other various output devices (e.g., speaker). The tension adjustment module 750 of FIG. 7 may be omitted from the electronic device 200, and in this case, step 1270 may be replaced with a step of outputting the notification.

The electronic device may include a housing, and a flexible display including a bendable section that can be extracted an internal space of the housing. The electronic device also may include a support member (e.g., the third support member 430 of FIG. 8) positioned at least partially in the inner space of the housing and including a first surface (e.g., one surface 431a of FIG. 8) facing the bendable section with a separation distance therebetween. The electronic device also may include a dielectric (e.g., the first dielectric 810 of FIG. 8) disposed in the first surface while facing the bendable section and electrically connected to a ground. The electronic device also includes a sensor IC electrically connected to a touch sensing circuit included in the flexible display and that detects capacitance of the touch area (e.g., the first touch area 811 of FIG. 8) facing the dielectric in the touch sensing circuit.

The electronic device may include a processor and a memory electrically connected to the processor. The memory may store an instruction that, when executed, causes the processor to control the sensor IC so as to activate a designated touch area including only the touch area facing the dielectric or locally including the touch area.

The memory may store an instruction that, when executed, causes the processor to activate the designated touch area and to obtain the capacitance of the touch area facing the dielectric while the bendable section is extracted from or retracted into the inner space of the housing.

The memory may store an instruction that, when executed, causes the processor to, when capacitance of the touch area is greater than a threshold value, output a notification of the capacitance through the screen (e.g., the screen 2301 of FIG. 2A or 3A) of the electronic device.

The memory may store an instruction that, when executed, causes the processor to control the tension adjustment module for adjusting tension acting on the bendable section based on capacitance of the touch area.

The electronic device may include a support sheet (e.g., the support sheet 470 of FIG. 4, 5, or 6) disposed in the rear surface of the flexible display or included in the flexible display. The electronic device may also include a tension structure (e.g., the first tension structure 1041 of FIG. 10) connected to the support sheet and that applies the tension to the bendable section based on the tension adjustment module.

A portion of the designated touch area may be included in the screen of the electronic device. The memory may store an instruction that, when executed, causes the processor to be nonresponsive to a touch input or a hovering input detected through the portion of the designated touch area.

The electronic device may include a pulley (e.g., the pulley 460 of FIG. 4, 5, or 6) positioned inside the housing corresponding to the bendable section. The first surface (e.g., one surface 431a of FIG. 8) of the support member may include a curved surface corresponding to the pulley.

The electronic device may include a sliding plate capable of sliding out from the housing. The flexible display may further include a first section disposed in the sliding plate and extending from the bendable section. The bendable section may be extracted from an inner space of the housing upon the sliding plate the sliding-out from the housing.

The electronic device may include a multi-bar structure extending from the sliding plate to between the pulley and a support sheet disposed in the flexible display.

The dielectric may be disposed in a groove formed in the first surface of the support member.

The dielectric may protrude toward the bendable section with respect to the first surface of the support member.

According to an embodiment of the disclosure, the dielectric may include a convex shape and face the bendable section.

According to an embodiment of the disclosure, the dielectric may include a flexible material.

An electronic device may include a housing and a sliding plate capable of sliding out from the housing. The electronic device also may include a flexible display. The flexible display includes a first section coupled to overlap the sliding plate and a bendable section that extends from the first section and that may be extracted from the internal space of the housing upon the sliding plate sliding out from the housing. The electronic device includes a pulley positioned inside the housing corresponding to the bendable section. The electronic device includes a support member positioned at least partially inside the housing and including a first surface facing the bendable section with a separation distance therebetween. The electronic device includes a dielectric disposed in the first surface while facing the bendable section and electrically connected to a ground. The electronic device may include a sensor IC electrically connected to a touch sensing circuit included in the flexible display and that detects capacitance of a touch area facing the dielectric in the touch sensing circuit.

The electronic device may include a processor and a memory electrically connected to the processor. The memory may store an instruction that, when executed, causes the processor to control the sensor IC to activate a designated touch area including only a touch area facing the dielectric or locally including the touch area.

The memory may store an instruction that, when executed, causes the processor to, when capacitance of the touch area is greater than a threshold value, output a notification of the capacitance through the screen of the electronic device.

The memory may store an instruction that, when executed, causes the processor to control a tension adjustment module for adjusting tension acting on the bendable section based on capacitance of the touch area.

The electronic device may include a support sheet disposed in a rear surface of the flexible display or included in the flexible display. The electronic device may also include a tension structure (e.g., the first tension structure 1041 of FIG. 10) connected to the support sheet and that applies the tension to the bendable section based on the tension adjustment module.

A portion of the designated touch area may be included in the screen of the electronic device. The memory may store an instruction that, when executed, causes the processor to be nonresponsive to a touch input or a hovering input detected through the portion of the designated touch area.

While the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a housing;
   a flexible display including a bendable section capable of being extracted from or retracted into an inner space of the housing;
   a support member assembly positioned at least partially in the housing and including a first surface facing the bendable section of the flexible display with a separation distance therebetween;
   a dielectric disposed on the first surface while facing the bendable section of the flexible display and electrically connected to a ground of the electronic device; and
   a sensor integrated circuit (IC), electrically connected through a touch sensing circuit included in the flexible display, configured to detect a capacitance change depending on a distance between the dielectric and the bendable section of the flexible display.

2. The electronic device of claim 1, further comprising:
   a processor; and
   memory storing instructions that, when executed by the processor, cause the electronic device to:
      control the sensor IC so as to activate a designated touch area of the touch sensor circuit including only a touch area facing the dielectric or locally including the touch area, and
      detect, through the touch area of the touch sensor circuit, the capacitance change depending on the distance between the dielectric and the bendable section of the flexible display.

3. The electronic device of claim 2, wherein the electronic device is configured to detect the capacitance change depending on the distance between the dielectric and the bendable section of the flexible display while the bendable section is extracted from or retracted into the inner space of the housing.

4. The electronic device of claim 2, wherein the memory stores an instruction that, when executed by the processor, causes the electronic device to, when the detected capacitance change is greater than a threshold value, output a notification through the flexible display.

5. The electronic device of claim 2, wherein the memory stores an instruction that, when executed by the processor, causes the electronic device to control a tension adjustment module configured to adjust tension with respect to the bendable section of the flexible display based on the detected capacitance change.

6. The electronic device of claim 5, further comprising:
   a support sheet disposed on a rear surface of the flexible display or included in the flexible display; and
   a tension structure connected to the support sheet and configured to apply the tension to the bendable section of the flexible display based on the tension adjustment module.

7. The electronic device of claim 2, wherein:
   a portion of the designated touch area is included in a screen of the electronic device formed by the flexible display; and
   the memory stores an instruction that, when executed by the processor, causes the electronic device to be nonresponsive to a touch input or a hovering input detected through the portion of the designated touch area.

8. The electronic device of claim 1,
   wherein the bendable section of the flexible display includes a curved part, a position of the curved part is changed according to an extraction or a retraction of the bendable section with respect to the housing,
   wherein the electronic device further comprises a curved member positioned in the housing corresponding to the curved part of the bendable section of the flexible display, and
   wherein the first surface of the support member assembly includes a curved surface corresponding to the curved member.

9. The electronic device of claim 8, further comprising a plate capable of sliding with respect to the housing,
- wherein the flexible display further comprises a first section disposed on the plate and extending from the bendable section, and
- wherein the position of the curved part of the bendable section of the flexible display is changed according to a sliding of the plate.

10. The electronic device of claim 8, further comprising:
- a support sheet disposed on a rear surface of the flexible display, and
- a multi-bar structure coupled to the support sheet and configured to support the bendable section of the flexible display, the multi-bar structure being in contact with the curved member.

11. The electronic device of claim 1, wherein the dielectric is disposed in a groove formed in the first surface of the support member assembly.

12. The electronic device of claim 1, wherein the dielectric protrudes toward the bendable section with respect to the first surface of the support member assembly.

13. The electronic device of claim 1, wherein the dielectric faces the bendable section and includes a convex shape.

14. The electronic device of claim 1, wherein the dielectric comprises a flexible material.

15. An electronic device, comprising:
- a housing;
- a plate capable of sliding with respect to the housing;
- a flexible display comprising a first section and a second section extending from the first section, wherein the second section of the flexible display includes a curved part, a position of the curved part is changed according to the sliding of the plate;
- a support member assembly positioned at least partially in the housing and including a first surface facing the second section of the flexible display with a separation distance therebetween;
- a dielectric disposed on the first surface while facing the second section of the flexible display and electrically connected to a ground of the electronic device; and
- a sensor integrated circuit (IC), electrically connected through a touch sensing circuit included in the flexible display, configured to detect a capacitance change depending on a distance between the dielectric and the second section of the flexible display.

16. The electronic device of claim 15, further comprising:
- a processor; and
- memory storing instructions that, when executed by the processor, cause the electronic device to:
  - control the sensor IC so as to activate a designated touch area of the touch sensor circuit including only a touch area facing the dielectric or locally including the touch area, and
  - detect, through the touch area of the touch sensor circuit, the capacitance change depending on the distance between the dielectric and the second section of the flexible display.

17. The electronic device of claim 16, wherein the memory stores an instruction that, when executed by the processor, causes the electronic device to, when the detected capacitance change is greater than a threshold value, output a notification of the capacitance through the flexible display.

18. The electronic device of claim 16, wherein the memory stores an instruction that, when executed by the processor, causes the electronic device to control a tension adjustment module configured to adjust tension with respect to the second section of the flexible display based on the detected capacitance change.

19. The electronic device of claim 18, further comprising:
- a support sheet disposed on a rear surface of the flexible display or included in the flexible display; and
- a tension structure connected to the support sheet and configured to apply the tension to the second section of the flexible display based on the tension adjustment module.

20. The electronic device of claim 16, wherein:
- a portion of the designated touch area is included in a screen of the electronic device formed by the flexible display; and
- the memory stores an instruction that, when executed by the processor, causes the electronic device to be non-responsive to a touch input or a hovering input detected through the portion of the designated touch area.

* * * * *